United States Patent
Perras et al.

(10) Patent No.: US 9,706,465 B2
(45) Date of Patent: Jul. 11, 2017

(54) SYSTEMS AND/OR METHODS FOR ANCHOR NODE SELECTION IN NETWORKS USING DISTRIBUTED MOBILITY MANAGEMENT (DMM)

(71) Applicant: InterDigital Patent Holdings, Inc., Wilmington, DE (US)

(72) Inventors: Michelle Perras, Montréal (CA); Alexander Reznik, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 67 days.

(21) Appl. No.: 14/648,836

(22) PCT Filed: Nov. 27, 2013

(86) PCT No.: PCT/US2013/072192
§ 371 (c)(1),
(2) Date: Jun. 1, 2015

(87) PCT Pub. No.: WO2014/085560
PCT Pub. Date: Jun. 5, 2014

(65) Prior Publication Data
US 2015/0319664 A1 Nov. 5, 2015

Related U.S. Application Data

(60) Provisional application No. 61/731,644, filed on Nov. 30, 2012.

(51) Int. Cl.
*H04W 4/00* (2009.01)
*H04W 36/22* (2009.01)
(Continued)

(52) U.S. Cl.
CPC ....... *H04W 36/22* (2013.01); *H04W 36/0061* (2013.01); *H04W 40/36* (2013.01); *H04W 48/17* (2013.01); *H04W 36/36* (2013.01)

(58) Field of Classification Search
CPC . H04W 36/22; H04W 36/0061; H04W 48/17; H04W 40/36; H04W 36/36
See application file for complete search history.

(56) References Cited

U.S. PATENT DOCUMENTS 8,068,838 B1 * 11/2011 Dinan .................. H04W 36/22
370/331
2006/0014562 A1 * 1/2006 Syrtsov ............... H04L 41/0893
455/556.2
(Continued)

FOREIGN PATENT DOCUMENTS

WO   WO 2012/015411 A1   2/2012

OTHER PUBLICATIONS

Bernardos et al., "PMIPv6-Based Distributed Anchoring-Draft-Bernardos-DMM-Distributed-Anchoring-01", DMM Working Group, Sep. 21, 2012, pp. 1-24.
(Continued)

*Primary Examiner* — Afshawn Towfighi
(74) *Attorney, Agent, or Firm* — Condo Roccia Koptiw LLP

(57) ABSTRACT

Systems and/or methods may be used to select an anchor node. For example, a device may detect or more anchor nodes that may be available for the device to connect to. The device may determine whether to handover to one of the detected anchor nodes based on capability information including load information of the anchor nodes. The device may connect to a detected anchor node based on the capability information including the load information. The detected anchor nodes may be grouped and the device may select and connect to an anchor node based on the groupings.

(Continued)

The device may also store a history including a route of the device and anchor nodes on the route and may use such information to determine whether to connect to detected anchor node. The device may further use proximity to content to determine whether to connect to a detected anchor node.

18 Claims, 16 Drawing Sheets

(51) Int. Cl.
*H04W 36/00* (2009.01)
*H04W 48/00* (2009.01)
*H04W 40/36* (2009.01)
*H04W 36/36* (2009.01)

(56) References Cited

U.S. PATENT DOCUMENTS

| | | | |
|---|---|---|---|
| 2007/0058587 A1* | 3/2007 | Han | H04L 45/24 370/331 |
| 2007/0249348 A1 | 10/2007 | Park | |
| 2010/0232330 A1* | 9/2010 | Cheng | H04W 52/0216 370/311 |
| 2011/0212729 A1* | 9/2011 | Li | H04W 48/16 455/450 |
| 2012/0071200 A1* | 3/2012 | Bienas | H04W 48/20 455/525 |
| 2012/0207137 A1 | 8/2012 | Zhou et al. | |
| 2012/0220325 A1* | 8/2012 | Zhou | H04W 74/0833 455/509 |
| 2013/0089018 A1* | 4/2013 | Kim | H04W 8/02 370/312 |

OTHER PUBLICATIONS

Bernardos et al., "Towards Flat and Distributed Mobility Management: a 3GPP Evolved Network Design", Workshop on Telecommunications: From Research to Standards, Jun. 10, 2012, pp. 6855-6861.

Damic et al., "Proxy Mobile IPv6 Indication and Discovery", Network Working Group, Feb. 25, 2008, pp. 1-17.

* cited by examiner

Device 202a may connect to GW 701 and may obtain IP1. Device 202a may move to GW 702 and may obtain IP2.

IP2 may be used to access content located at Access GW 701. IP1 may not be used anymore. Device 202a may move to Access GW 703.

IP1 may be used to access content 704 located at Access GW 701. IP2 may not be used. Device 202a may move to Access GW 703.

US 9,706,465 B2

SYSTEMS AND/OR METHODS FOR ANCHOR NODE SELECTION IN NETWORKS USING DISTRIBUTED MOBILITY MANAGEMENT (DMM)

CROSS-REFERENCE TO RELATED APPLICATIONS

This application is the National Stage Entry under 35 U.S.C. §371 of Patent Cooperation Treaty Application No. PCT/US2013/072192, filed Nov. 27, 2013, which claims the benefit of U.S. Provisional Patent Application No. 61/731,644, filed Nov. 30, 2012, the contents of which are hereby incorporated by reference herein.

BACKGROUND

Dense networks are currently emerging in a variety of environments including urban settings. For example, mobile data demand has been increasing in light of the increase in the number of users with mobile devices. In particular, currently, there has been an increase in traffic volume, number of transactions, and number of mobile devices. Accordingly, higher data rates with improved quality of service as well as low costs may be needed. Unfortunately, current cellular networks lend to be already overloaded and may not be able to meet the data demands. As such, operators may implement dense networks to handle the increase in demand by deploying femtocells, small cells, microcells, and/or the like to offload traffic from a core or macro network. In examples, these offloading techniques may be integrated into the mobile operator's managed network, rather than replacing the network. Further, such a dense network deployment may enable diverting a large amount of traffic away from the congested and expensive macro network (e.g., the core network).

Session continuity support in the dense network context may be needed, for example, without burdening the mobile core network. Distributed mobility management (DMM) may be used for offloading traffic from the core network. For example, mobility management may be distributed outside of the core network, ensuring the usage of the most efficient data path while also handling session continuity. As such, it may be beneficial to use DMM in combination with the dense networks to further offload traffic. However, currently using DMM in dense networks where there may be several DMM gateways or anchor nodes may result in an increase in handovers between the gateways. Such an increase of hand overs may result in the device of the user having to reconcile additional IP addresses established with the increased number of gateways or anchor nodes being handed over to. Further, such an increase of gateways and/or handovers thereto may result in an increase in tunnels between such gateways or anchor nodes and the device. As such, the additional gateways ur anchor nodes in a dense network that may include current DMM techniques may result in the device performing handovers frequently and, thus, degrading the performance on the network and/or for the device itself, which may lead to a poor user experience.

SUMMARY

Systems and/or methods may be used to select an anchor node. For example, a device may detect one or more anchor nodes that may be available for the device to connect to (e.g., to handover to and establish a connection such as an IP address and tunnel with). The device may determine whether to handover to one of the detected anchor nodes based on capability information including load information of the anchor nodes. For example, the device may connect to a detected anchor node when, based on the determination, the capability information including the load information indicates the detected anchor node may not be overloaded. Further, anchor nodes may be gouped and the device may select and connect to an anchor node based on the groupings. The device may also store a history including one or more routes of the device and anchor nodes on the one or more routes and may use that information to determine whether to connect to a detected anchor node. In an example, the device may determine whether to connect to a detected anchor mode based on its proximity to content (e.g., whether it may include or be close to an anchor node).

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments may now be described with reference to the various Figures. Although this description provides a detailed example of possible implementations, it should be noted that the details are intended to be exemplary and in no way limit the scope of the application.

Systems and/or methods (e.g., anchor node selection using capability information, load information, history information, route prediction, smart access selection, destination anchor node selection, and/or the like) for selecting one or more anchor nodes in a network may be provided and/or used. In an example, anchor node selection may enable Distributed Mobility Management (DMM) usage in networks. Such anchor node selections (e.g., using capability information, load information, history information, route predication, smart access selection, destination anchor node selection, and/or the like) may help reduce problems associated with poor user experience as described herein. For example, the systems and/or methods associated with anchor node selection described herein may help limit the number of handovers in a dense network using DMM, which may result in less IP address and/or tunnels. In particular, as described herein, the number of available anchor nodes that may be introduced by DMM in dense networks may introduce undesirable handovers. For example, the anchor nodes may not have the same capabilities or some may already be servicing many devices. Accordingly, systems and/or methods for enabling the device to select the most appropriate anchor node may (e.g., the anchor node selection systems and/or methods described herein) may help avoid that type of situation. Further, in a dense network environment, the device may end-up being anchored at different anchor nodes simultaneously. A smart access selection as described herein for flows may help enable an optimized or improved data path to be used (e.g., even when the device may continue to move).

Figure 1A:
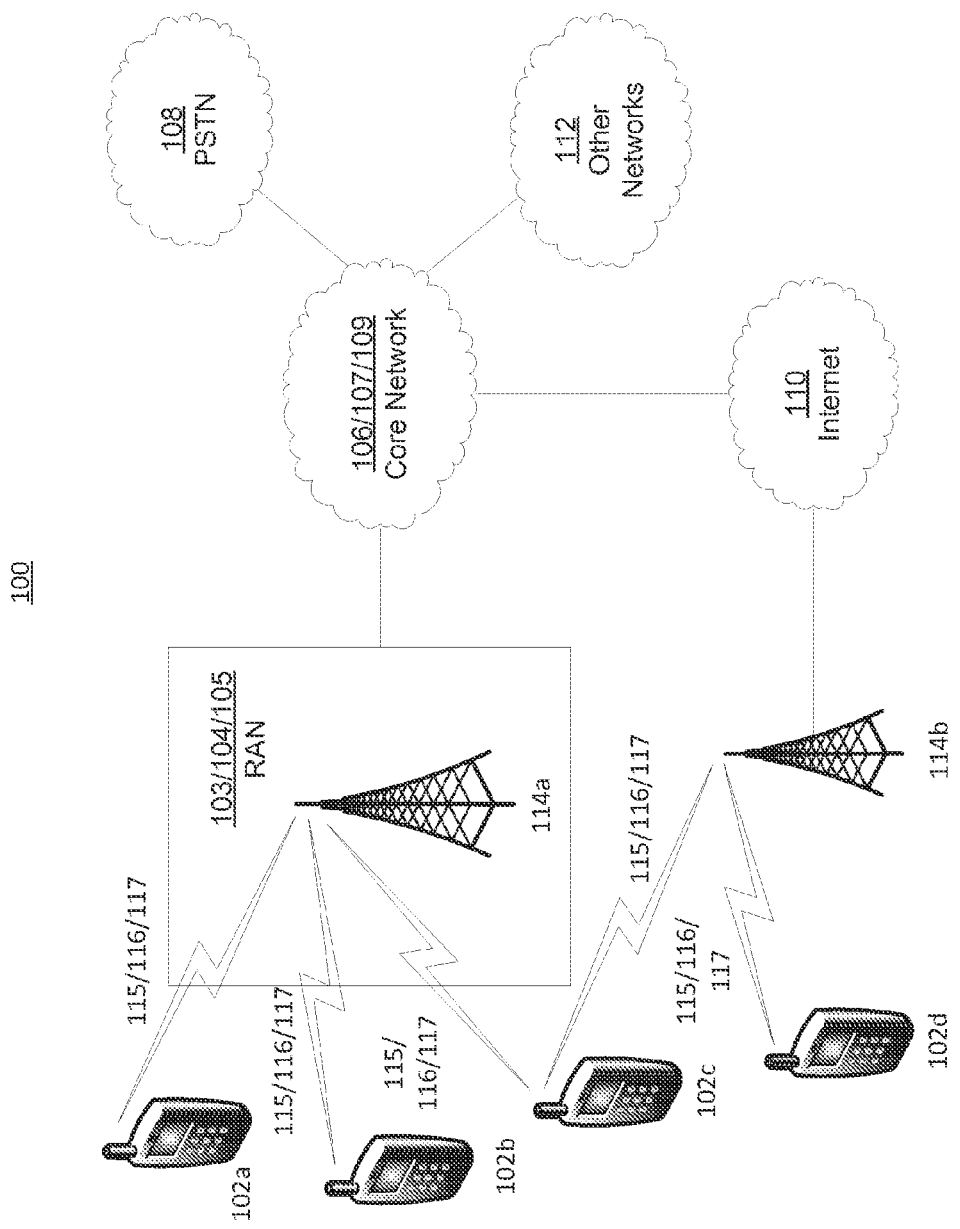
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, or the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDM2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRLTs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
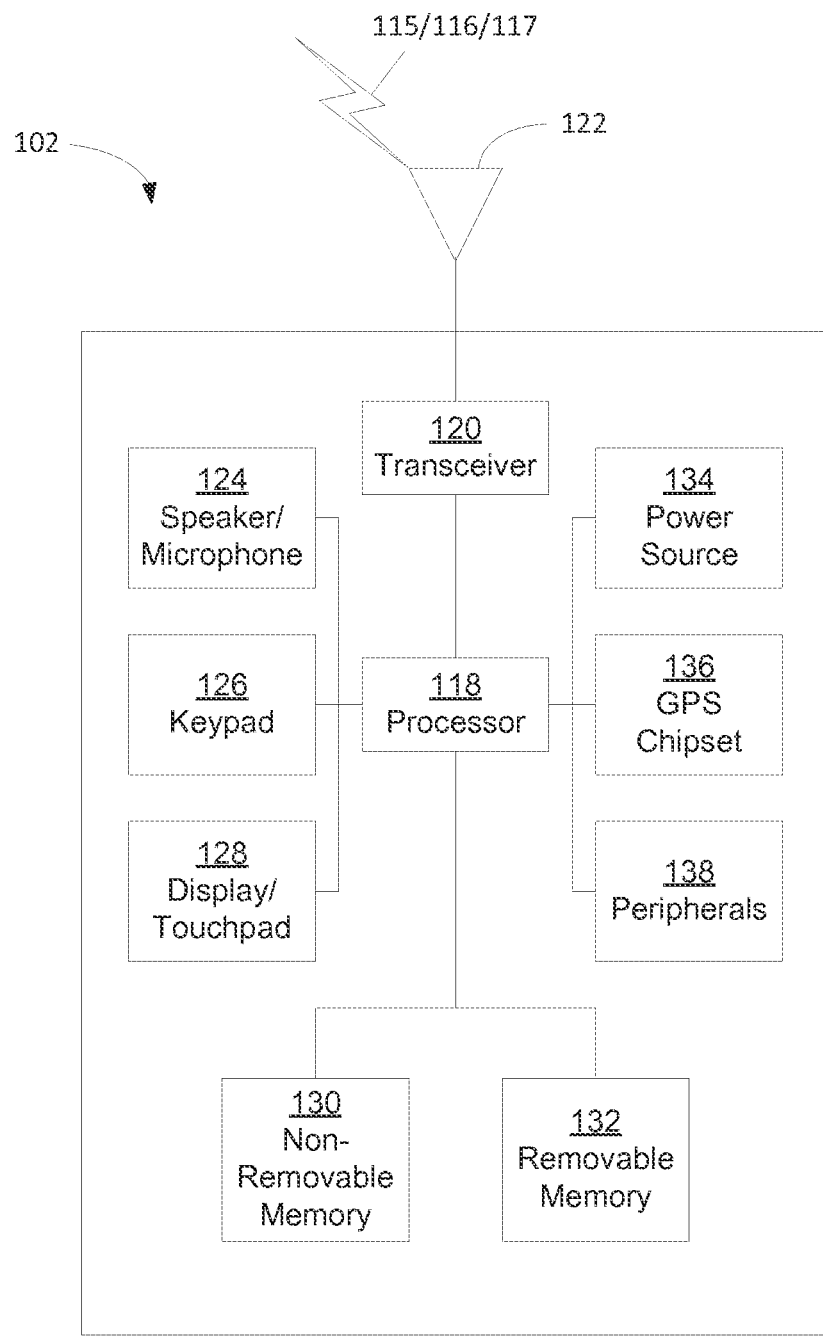
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
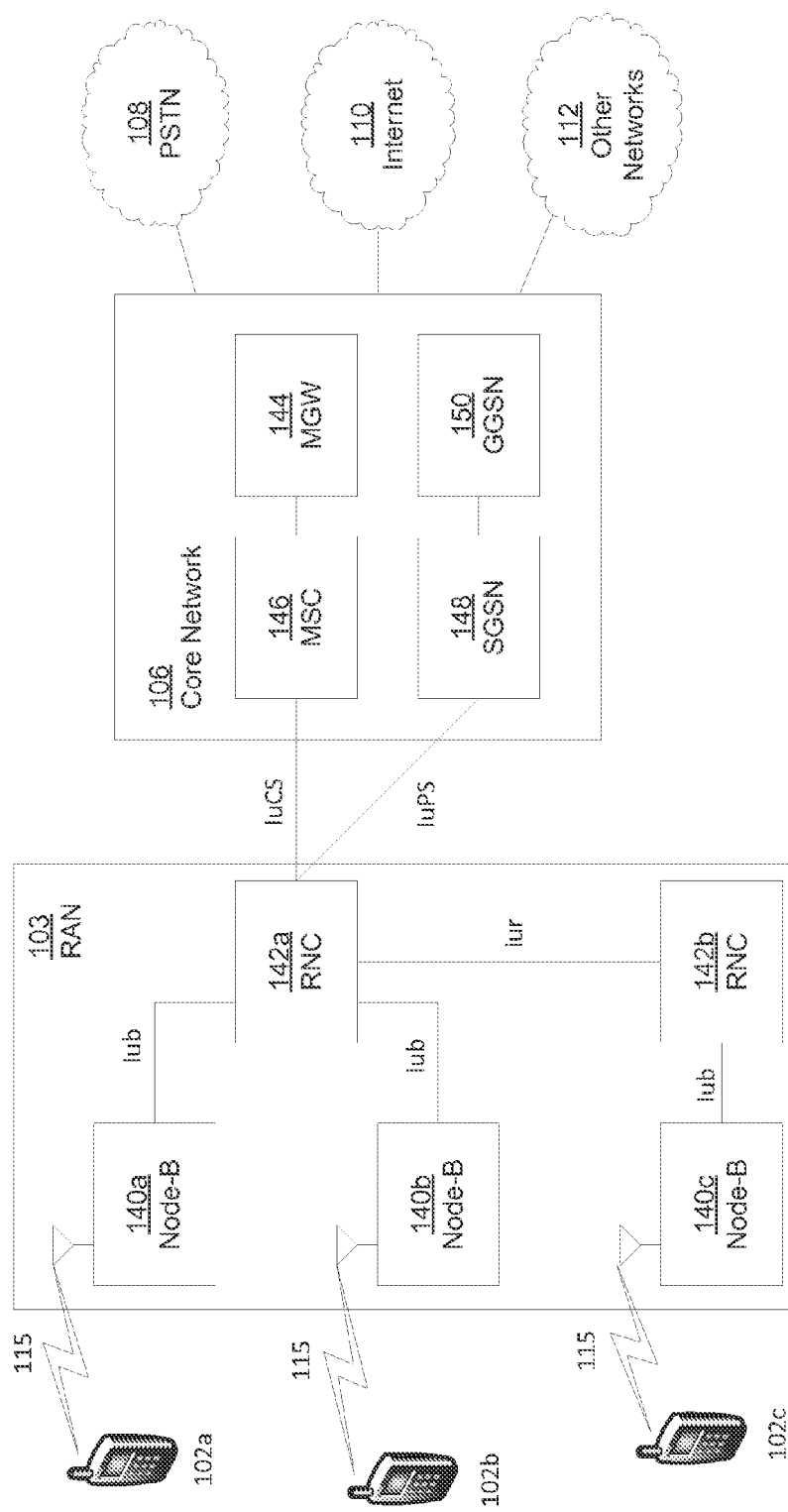
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
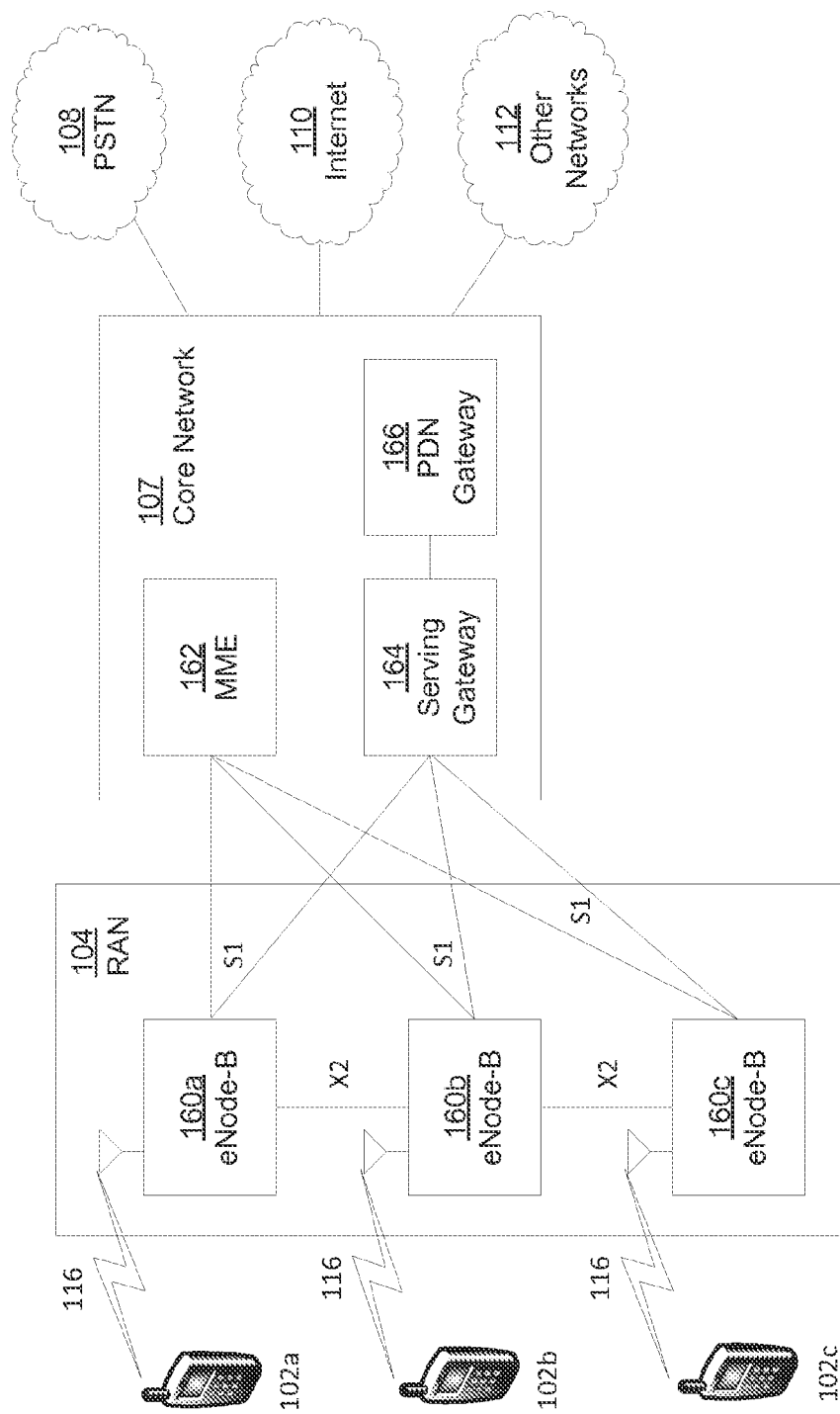
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
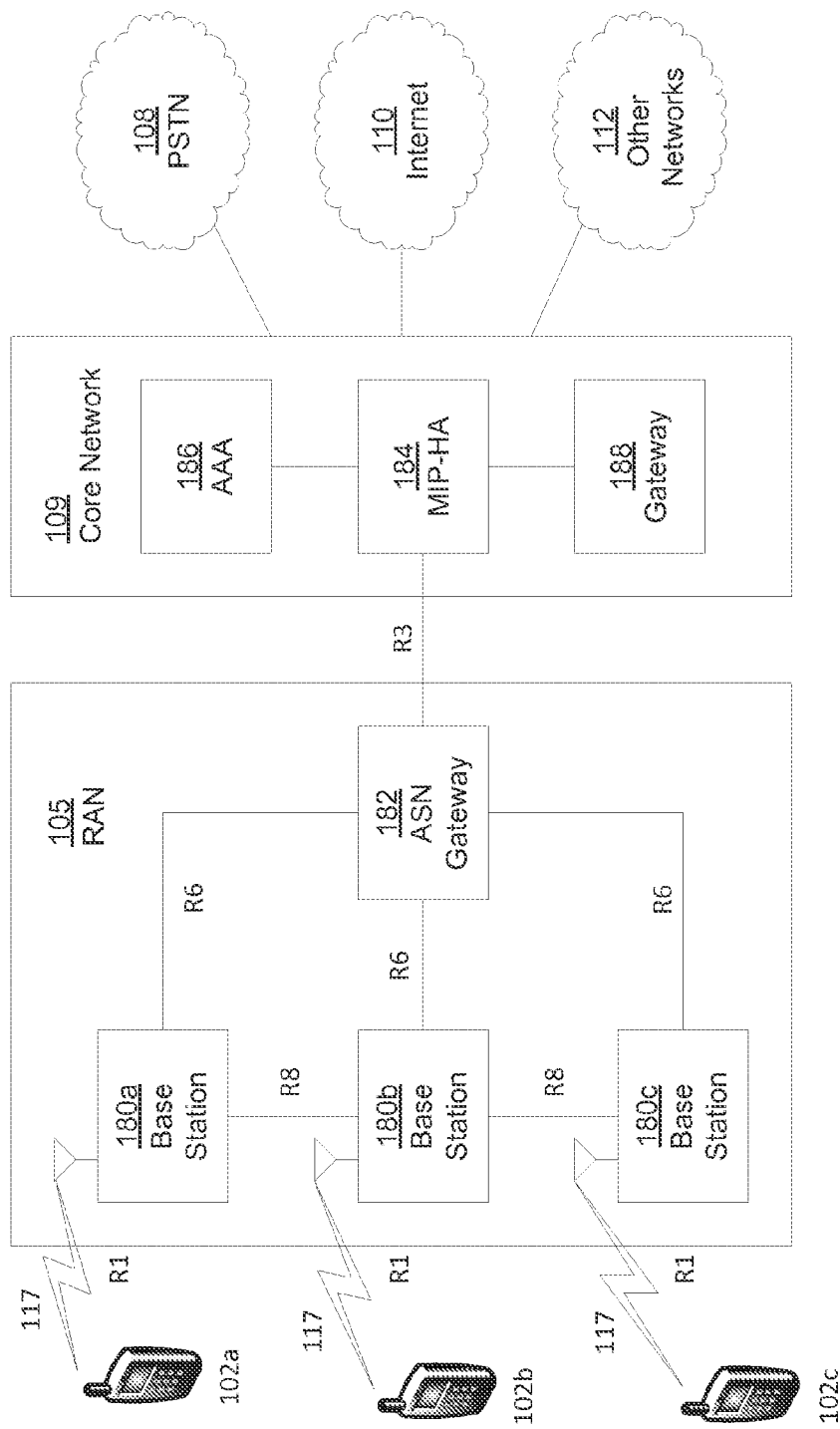
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRU is 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102*b*, 102*c* between the RAN 105 and the other ASNs. The communication link between the core network 109 and the other core networks may be defined as an R5 reference, which may include protocols for facilitating interworking between home core networks and visited core networks.

Systems and/or methods for selecting one or more anchor nodes in a network may be provided and/or used. In an example, for enhanced anchor node selection are described to enable Distributed Mobility Management (DMM) usage in networks. One or more problems associated with poor user experience, as described in detail above, may be reduced using systems and/or methods described herein. Moreover, as described herein, the number of available anchor nodes that may be introduced by DMM in dense networks may introduce undesirable handovers. For example, the anchor nodes may not have the same capabilities or some may already be servicing many devices. Accordingly, systems and/or methods for enabling the device to select the most appropriate anchor node may help avoid that type of situation. In a dense network environment, the device may end-up being anchored at different anchor nodes simultaneously. A smart access selection as described herein for flows may help enable an optimized or improved data path to be used (e.g., even when the device may continue to move).

As described herein, a handover (HO) and/or IP flow mobility (IFOM) may be performed, provided, and/or implemented. For example, an inter-technology handover (HO) and/or an intra-technology HO may be supported. In an example, these HOs may be based on a mobility protocol such as a mobile IP protocol (MIP), proxy MIP (PMIP), and/or the like. Further, an anchor node may be provided and/or used, for example, to perform and/or implement the HO and/or IFOM. An anchor node may maintain a location and/or IP address (e.g., a current location and/or IP address) of a device such as a WTRU including the WTRUs 102*a-d* of FIGS. 1A-1E to enable and/or allow access to the device. A device using a single interface may disconnect from, reconnect to, and/or may update the anchor node. A device using multiple interfaces may connect (e.g., simultaneously) from both interfaces with the anchor node and may decide to move the traffic (e.g., all traffic or one or more flows) from one interface to the other by updating the anchor node with specific filters.

One or more triggers may be used to initiate a HO and/or IFOM. The triggers may include congestion, user and/or operator preferences, signal quality, and/or the like. Further, in an example, with the support of distributed mobility management (DMM), a HO may be triggered if a closer anchor node may be detected. However, performing such a HO may result in consecutive handovers being performed. In examples, such consecutive HOs may be useless and/or undesirable such as going from a first gateway (GW1) to a second gateway (GW2) to a third gateway (GW3), and/or the like creating multiple tunnels therebetween.

Figure 2:
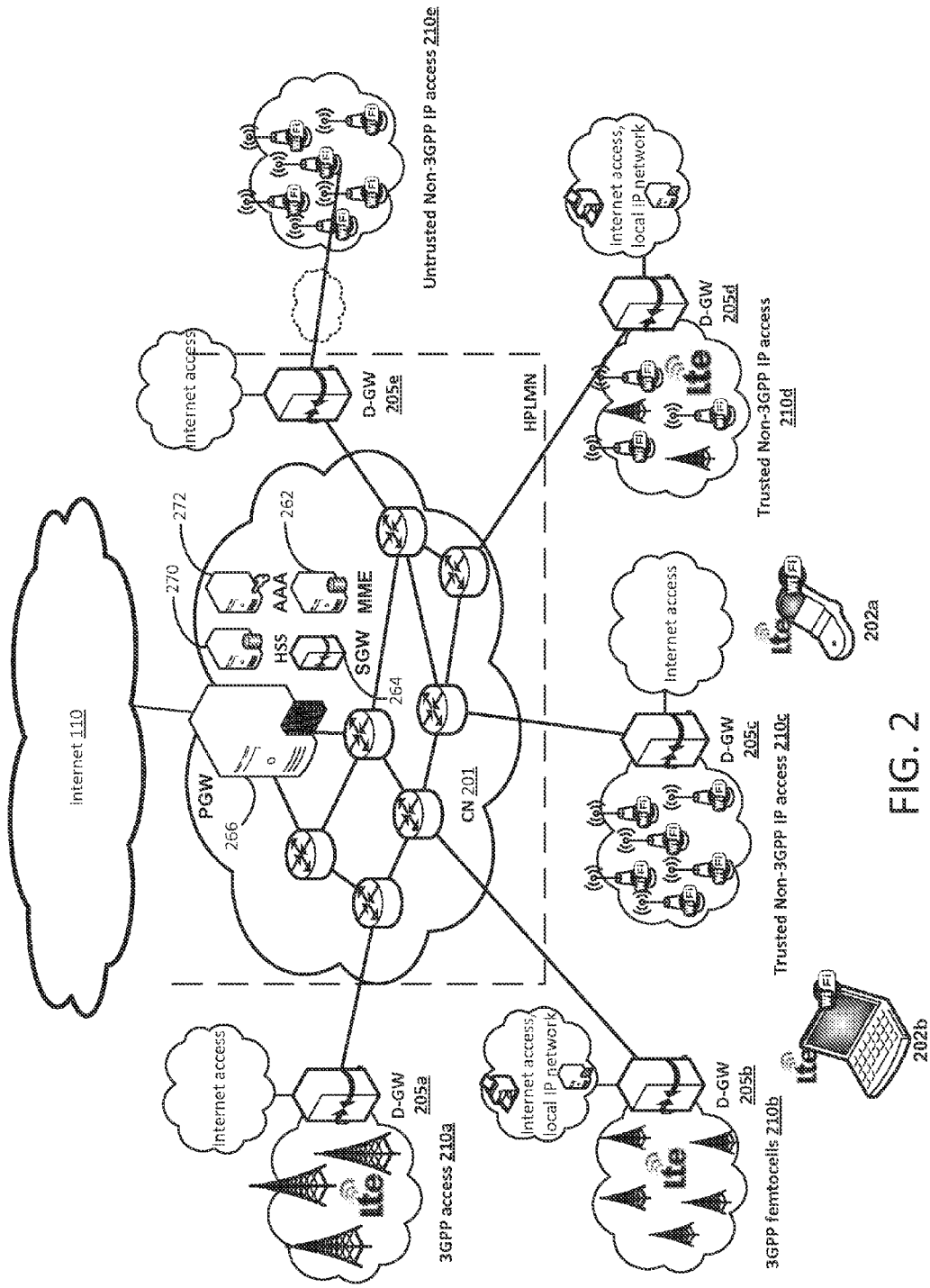
FIG. 2 shows a high level view of a distributed mobility management (DMM)-based network architecture.

As described herein, DMM may be used to push the anchor nodes to the edge of the network and enable the usage of multiple anchor nodes. A Distributed Gateway (D-GW) may be used as an anchor node in an example DMM. FIG. 2 shows a high level global view of the DMM-based network architecture that may include a D-GW.

As shown in FIG. 2, an architecture may include a core network (CN) 201 such as a mobile core network (MCN) and/or one or more access networks or local networks 210*a-e* of a public land mobile network (PLMN) such as a home PLMN (HPLMN). As shown, the core network 201 may include a MME 262 that may be similar to the MME 162 shown in FIG. 1D, a serving gateway (SGW) 264 that may be similar to the serving gateway 164 shown in FIG. 1D, a PDN gateway (PGW) 266 that may be similar to the PDN 166 shown in FIG. 1D, a AAA 272 that may be similar to AAA 186 shown in FIG. 1E, a home subscriber server (HSS) 270 that may be a database or storage medium that includes user-related and/or subscriber-related information and/or may provide support functions in mobility management, call and/or session setup, user authentication and/or access authorization, and/or the like.

As shown, the access networks 210*a-e* may be in communication with the core network 201 and may provide a device 202*a-b* access to the core network 201. The access networks 210*a-e* may be radio access networks (RANs), WiFi networks, and/or the like. For example, the access networks 210*a-e* may be 3GPP access networks, small-cell 3GPP access networks such as 3GPP femtocells, picocells, and/or the like, trusted non-3GPP access networks including trusted non-3GPP IP access networks, untrusted non-3GPP access networks including, untrusted non-3GPP IP access networks, and/or the like. The access networks 210*a-e* may include one or more access points, base stations, eNBs, HeNBs, NBs, and/or the like that may be connected to the core network 201 and/or the device 202 to provide a communication link between the core network and the device 202*a-b*.

The architecture 200 may further include one or more D-GWs 205*a-e*. As shown, the D-GWs 205*a-e* may be a logical network entity that may be located at the edge of a network such as the core network 201 and/or one or more of the access networks 210*a-e* such that the D-GWs 205*a-c* may be close to the device 202*a-b*, which may include a WTRU such as the WTRUs 102*a-d* shown in FIGS. 1A-1E, a UE, and/or the like. In examples, one or more of the D-GWs 205*a-e* may be collocated with existing 3GPP nodes and/or deployed as a standalone entity.

Figure 3:
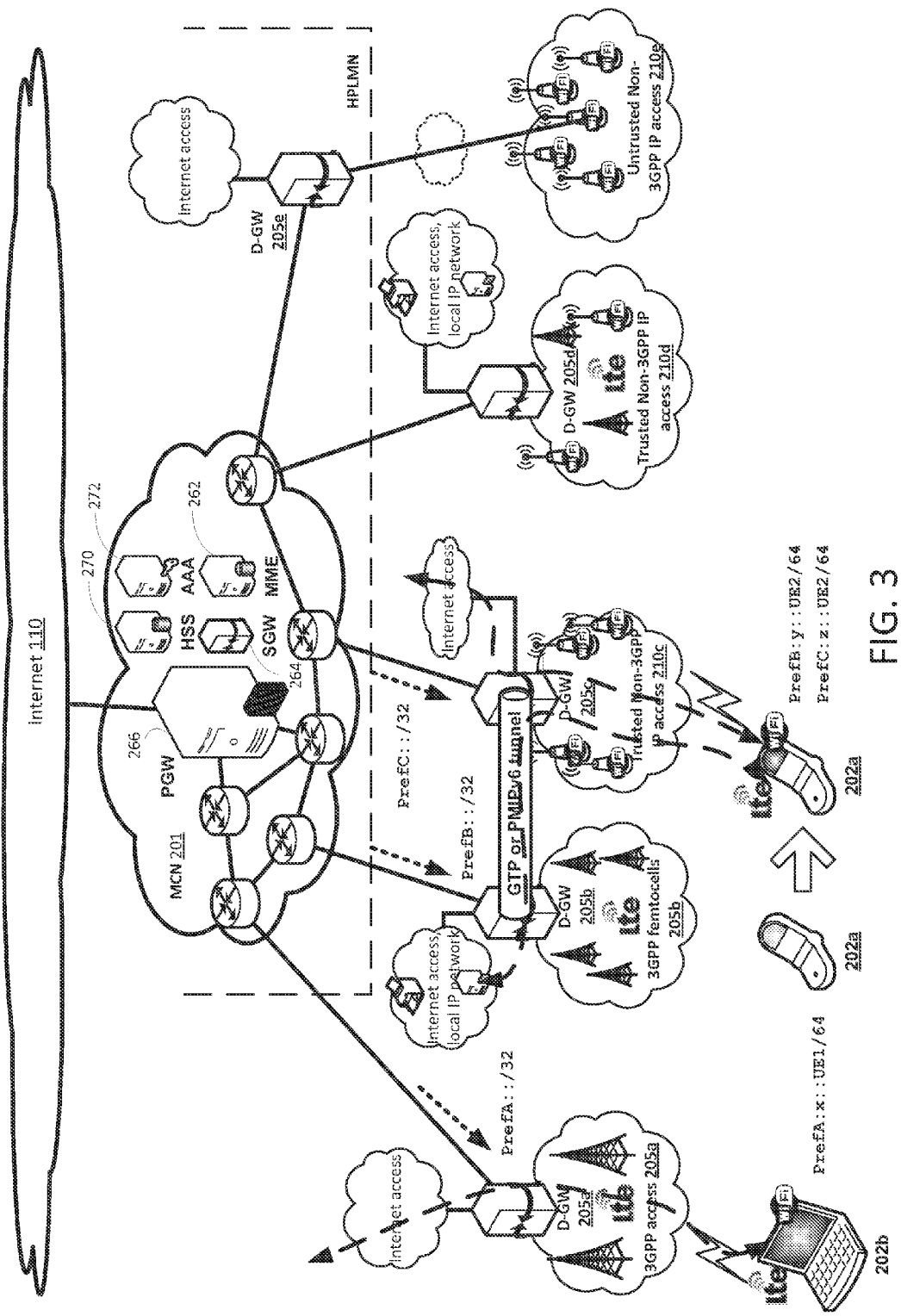
FIG. 3 shows an example of a DMM-based mobile network with GPRS Tunneling Protocol (GTP) and PMIPv6.

FIG. 3 shows an example of a DMM-based mobile network with GPRS Tunneling Protocol (GTP) and PMIPv6 (e.g., a GTP and/or PMIPv6 tunnel). For example, a PDN connection may be requested by the device 202*a* and/or 202*b*. The PDN connection may be handled by a D-GW such as the D-GW 205*b* and/or the D-GWs 205*a*, 205*c*, 205*d*, and/or 205*e*. An IPv6 prefix from its pool may be assigned to the device 202*a*, for example. This prefix may be conveyed to the device 202*a* and/or 202*b* so that it may auto-configure an IPv6 address. The device 202*a* and/or 202*b* may start sending and receiving IPv6 packets, which may be routed via the D-GW such as the D-GWs 205*a-e*, without traversing the core network such as the CN 201.

The device 202*a* and/or 202*b* may move and attach to another access network. For example, the device 202*a* may move from the access network 210*b* to 210*c*, as shown in FIG. 3. In examples (e.g., if the device may move and/or attach to another access network), one or more of the following may be used. The PDN connections that the device may have established may be maintained (e.g., the address may be preserved). This may enable, for each of the PDN connections of the device 202*a* and/or 202*b*, that the D-GW such as one or more of the D-GWs 205*a-e* that may be anchoring the IP address used by the device may play the role of PGW (e.g., a Local Mobility Anchor (LMA)) for that PDN connection. As such, the D-GW such as the D-GWs 205*a-e* may perform the LMA functions for that WTRU and that PDN connection. A device such as the device 202*a* may be attached to the D-GW such as the D-GW 205 and/or 205*c*. For each of the PDN connections of the device anchored at other D-GWs, the D-GW such as the D-GW 205b and/or 205c may assume the role of Media Access Gateway (MAG) and/or may create a GTP/PMIPv6 tunnel such as tunnel 280 toward each LMA.

Further, in an example, the device 202a and/or 202b may request one or more PDN connections to the D-GW (e.g., one of the D-GWs 205a-e) that the device may be attached to. This may provide the device 202a and/or 202b with an IPv6 address anchored at the serving D-GW, which may be used by the device 202a and/or 202b to perform optimal routing while making use of the operator's network resources. Device smart IP address management may be provided and/or used, for example, in DMM. For example, IP address selection mechanisms that may be used by the device 202a and/or 202b may be enhanced to enable the device to use an IPv6 address anchored at the D-GW such as the D-GWs 205a-e that the device 202a and/or 202b may be currently attached to. In this manner, one or More communications (e.g., new communications) may make use of locally anchored IPv6 addresses while one or more other communications (e.g., old communications) may be maintained, for example, seamlessly by ensuring IPv6 address continuity.

A Local Gateway (L-GW) may be used in DMM. The L-GW may be a gateway in a Local Home Network (LHN) (e.g., at an edge thereof) that may provide connectivity between components in the LHN and/or a CN such as a MCN or an evolved packet core (EPC) and/or that may be used to offload traffic between components of a MCN and/or a LHN. In an example, device mobility between L-GWs (e.g., in DMM) within different Local Home Networks (LHN) connecting to the same or different PDNs may be enabled by the use of tunnels. For example, in a network-based mobile network, a tunnel such as a PMIP tunnel may be created between one L-GW such as a "previously connected L-GW" and another L-GW such as a "currently connected L-GW." The connected L-GW may behave as a MAG for the existing IP flows and as an LMA for the additional IP flows. L-GWs for which the device was previously connected, may behave as LMAs for example.

Figure 4:
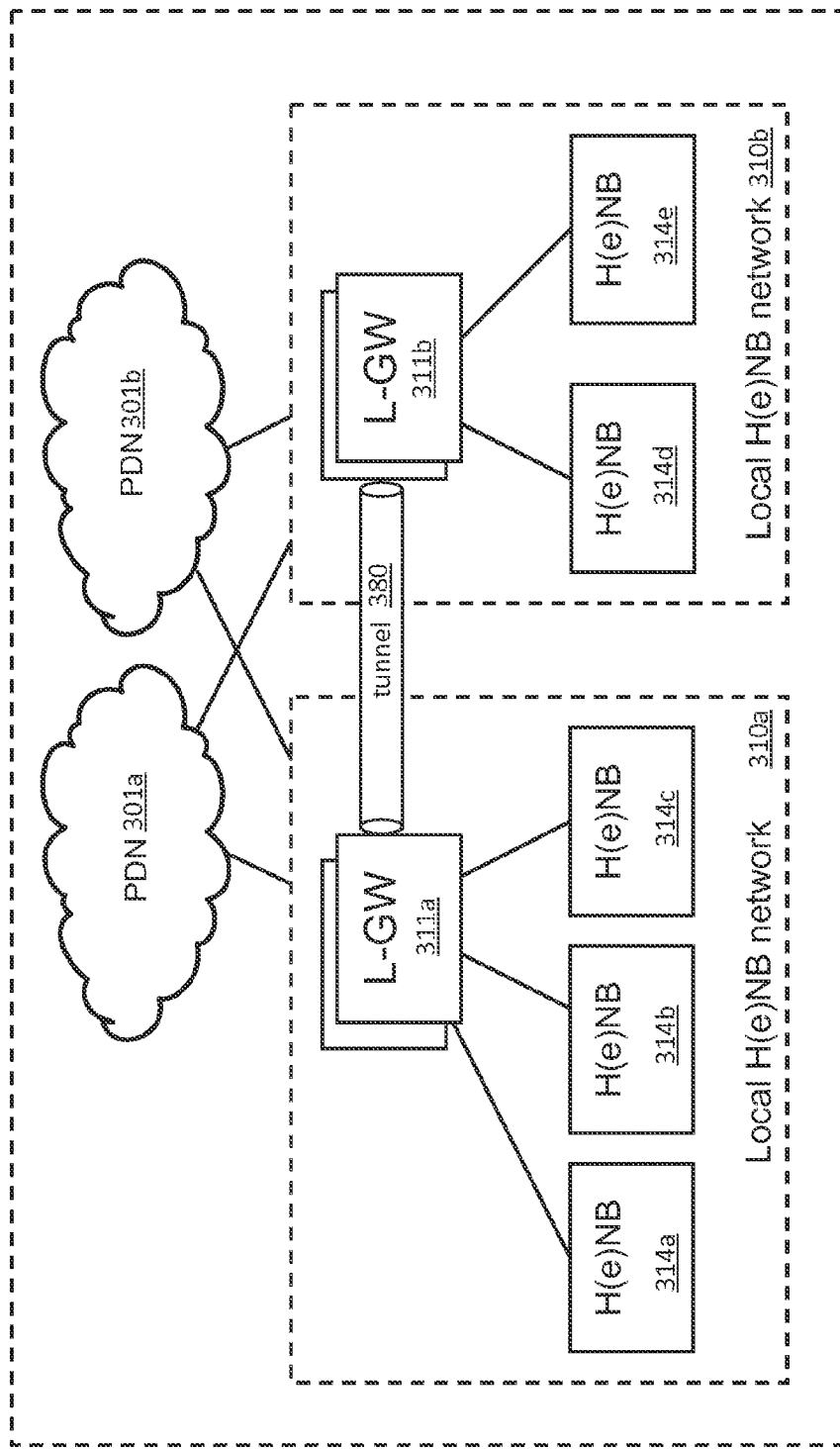
FIG. 4 shows an example of wireless transmit/receive unit (WTRU) mobility between Local Gateways (L-GWs) in a network-based mobile network.

FIG. 4 shows an example of device mobility between L-GWs in a network-based mobile network. As shown in FIG. 4, one or more PDNs such as PDNs 301a and/or 301b that may be part of a core network may be in communication with one or more L-GWs such as L-GW 311a and/or 311b of different LHNs such as LHN 310a and/or 310b. The L-GW 311a may be attached and/or connected to one or more HeNBs 314a-c and the L-GW 311b may be attached and/or connected to one or more HeNBs 314d-e. In an example, the HeNBs 314a-e may be similar or the same as described herein with respect to FIGS. 1A and 1C-1E. As shown, device mobility between L-GWs 311a-b within the LHNs310a-b that may be connected to the same or different PDNs 301a-b may be enabled by the use of a tunnel such a tunnel 380. For example, the tunnel 380 may be created between the L-GW 311a, and the L-GW 311b. The L-GW 311a may be a "previously connected L-GW" and the L-GW 311b may be a "currently connected L-GW" or vice versa. In a network-based mobile network, the tunnel 380 may be, for example, a PMIP tunnel. The connected L-GW 311a and/or 311b may behave as a MAG for the existing IP flows and as an LMA for the additional IP flows. The L-GW for which the device was previously connected (e.g., 311b when the connected L-GW may be L-GW 311a or 311a when the connected L-GW may be L-GW 311b) may behave as a LMA, for example.

Figure 5:
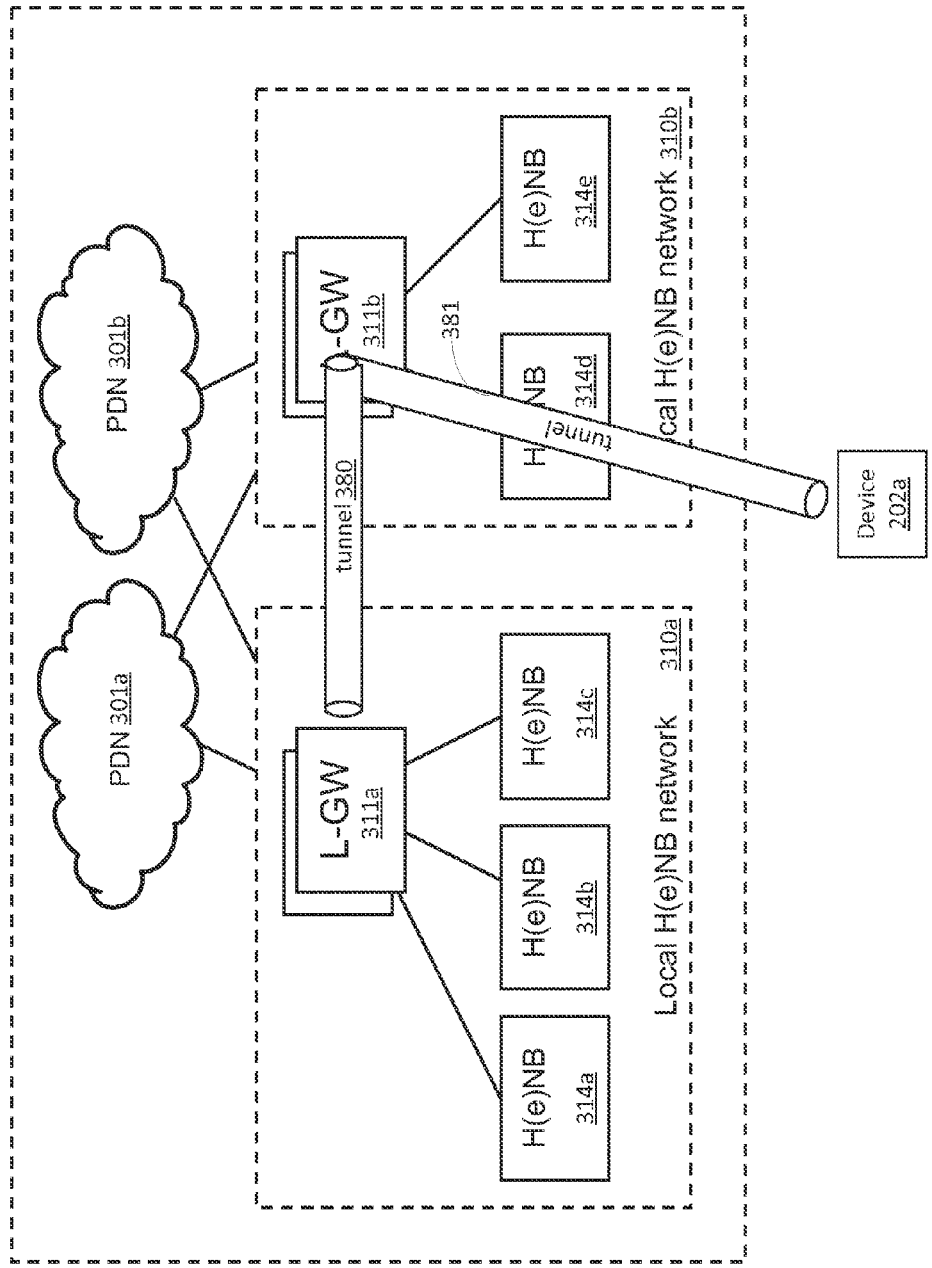
FIG. 5 shows an example of WTRU mobility between L-GWs in a mobile-based mobile network.

FIG. 5 shows an example of WTRU mobility between L-GWs in a mobile-based mobile network. As shown in FIG. 5, device mobility between L-GWs 311a-b within the LHNs310a-b that may be connected to the same or different PDNs 301a-b may be enabled by the use of a tunnel such a tunnel 380. For example, in a mobile-based mobile network the tunnel 381 may be created between the L-GW 311a and the device 202a. The L-GW 311a may be a "previously connected L-GW" and the L-GW 311b may be a "currently connected L-GW" or vice versa. In an example, the tunnel 381 may be a Dual Stack MIP (DSMIP) tunnel. The connected L-GW such as L-GW 311b may behave as a normal router while the L-GW such as the L-GW 311a for which the device 202a may have been previously connected may behave as Home Agents (HAs). In an example, encapsulation may be performed, for example, when sending packets in the tunnel 381 and de-encapsulation may be performed, for example, when receiving packets via the tunnel 381. The encapsulation and de-encapsulation may be performed by the L-GW 311a and device 202a in this example. The L-GW 311b may act or function, for example, as a router and may not be involved in tunneling.

In examples, pre-registration may be provided and/or used (e.g., with a neighbor concept). In pre-registration, each GW such as a L-GW (e.g., 311a and/or 311b in FIGS. 4-5) and/or D-GW (e.g., one or more of 205a-e in FIG. 2-3) may know which GWs may be neighboring GWs (e.g., may be its neighbors). Such neighboring information may be provided, for example, via a configuration. In an example, neighbors may be defined as GWs for which the device such as the device 202a may directly handover. A pre-registration may be performed on the neighbor GWs, for example, an inactive binding entry may be created on the neighbor GWs providing information to create a tunnel between the current GW (e.g., for which the device may be connected) and the previous GW (e.g., the anchor for some of the device's IP flows).

As described herein, dense networks may be emerging in urban settings. For example, the mobile data demand may be increasing exponentially with the increase in traffic volume, number of transactions, and number of mobile devices. Higher data rates with improved quality of service as well as low costs may be used to support such increase. Unfortunately, current cellular networks may already be overloaded and, thus, may not be able meet the data demands. As such, operators may deploy femtocells, microcells, and/or other small cells to offload traffic from the cellular network. Further, such offloading solutions (e.g., femtocells, microcells, and/or other small cells) may be integrated into the mobile operator's managed network (e.g., rather than replacing the managed network). In an example, dense deployment of such solutions may enable for diverting a large amount of traffic away from the congested and expensive macro network.

Session continuity support in a dense network context may also be provided and/or used (e.g., without burdening the mobile core network). Further. DMM may be provided and/or used for offloading the mobile core network. For example, the mobility management may be distributed outside of the core network which may ensure the usage of the most efficient data path while also handling session continuity. The ability to use DMM in dense networks may be beneficial. However, to make DMM work efficiently in dense networks, additional solutions and/or techniques may be used for traditional network deployments. For example, the multitude of available anchor nodes may have to be resolved. Having many available anchor nodes may result in a device performing handovers frequently and therefore degrading the performance on the network and/or for the WTRU itself. This may lead to a poor user experience. Moreover, the multitude of available anchor nodes that may be introduced by DMM in dense networks may result in undesirable handovers (HOs). For example, one or more of the anchor nodes may not have the same capabilities and/or may be loaded already (e.g., may be serving several devices). The device may also be unable to select an appropriate anchor node to avoid such situations. Further, in an example (e.g., in a dense network environment), the device may end-up being anchored at different anchor nodes simultaneously; however, currently a selection technique or mechanism (e.g., a smart access selection) may not be provided and/or used when starting new flows such that an optimized data path may be used for the different anchored anchor nodes (e.g., when the device may be moving).

As such, systems and/or methods for enabling DMM usage in networks such as dense networks may be provided and/or used. For example, described herein may be methods to enable DMM in the context of dense networks and to enhance anchor node selection to avoid undesirable handovers and/or improve the user experience. Additionally, since the device may end-up being anchored at many anchor nodes, the methods here may select an appropriate anchor node (e.g., when starting a new flow on the device). A method that may increase and/or accelerate registration with an anchor node may be provided and/or used (e.g., since the device may connect to multiple anchor nodes, for example, as a result of network density). In examples, the systems and/or methods may provide and/or use DMM-enabled architecture models in the context of dense networks; may improve and/or enhance anchor node selection, for example, by improving a capability discovery mechanism, by using groups that may provide and/or enable a faster anchor node selection and/or may improve a handover decision procedure, and/or by introducing a method to evaluate the distance between the device and an anchor node; may provide route prediction algorithms and procedures including connecting to destination node algorithms and procedures; may provide smart access selection (e.g., segregation), and/or may provide a short connection time mechanism or technique as described herein.

One or more architecture models may be provided and/or used to implement one or more of the systems and/or to perform one or more of the methods described herein. The architecture models in the context of dense networks may be defined as follows in an example. A L-GW may be used in a dense network. In an example, a L-GW may be an anchor node and the device may connect to another L-GW (e.g., another anchor node) when going to another LHN while maintaining session connectivity. In a dense network, the device may have access to many L-GWs from within the same LHN or different LHNs and/or may connect to the same or different PDNs.

Figure 6:
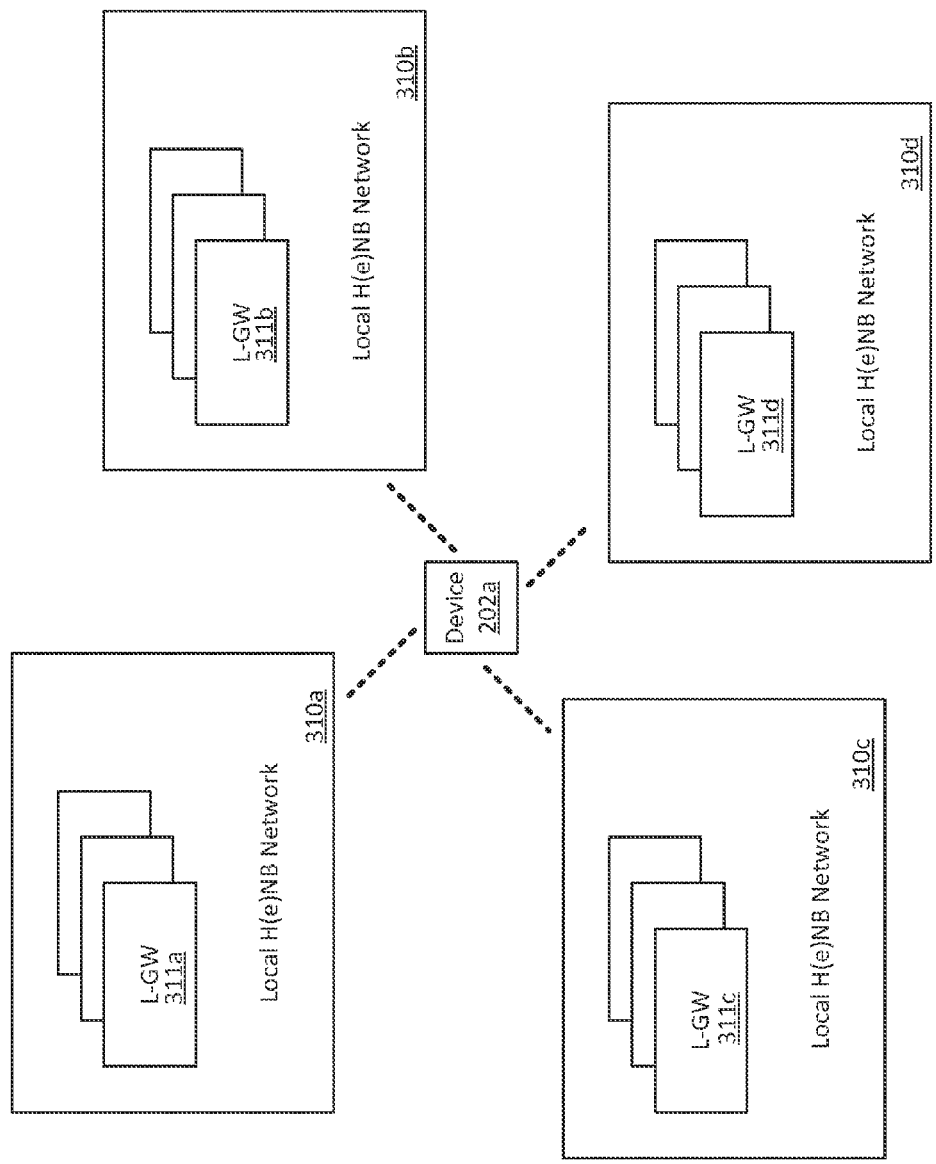
FIG. 6 shows an example of a L-GW evolved for DMM in a dense network.

FIG. 6 shows an example of one or more L-GWs that may be provided and/or used for DMM in a dense network. As shown FIG. 6, the device 202a may connect to one or more L-GWs 311a-d in one or more respective networks 310a-d such that the device 202a may connect to the same or different PDNs (not shown) that may be connected to or in communication with the L-GWs. As shown, one or more of the L-GWs 311a-d may act as an anchor node for the device 202a. According to an example, a L-GW such as L-GW 311a, for example, may be an anchor node (e.g., for the device 202a currently). The device 202a may further connect to another L-GW such as L-GW 311b-d (e.g., another anchor node) when going to another LHN such as networks 310b-d while maintaining session connectivity.

As described herein, a D-GW may be used in a dense network (e.g., with DMM). In an example, a D-GW may be an anchor node (e.g., in DMM) and the device may connect to another D-GW (e.g., another anchor node) when going to another access GW implementing DMM, for example, while maintaining session connectivity. In a dense network, the device may have access to one or more D-GWs such as multiple D-GWs using the same or different technologies and/or interfaces.

Figure 7:
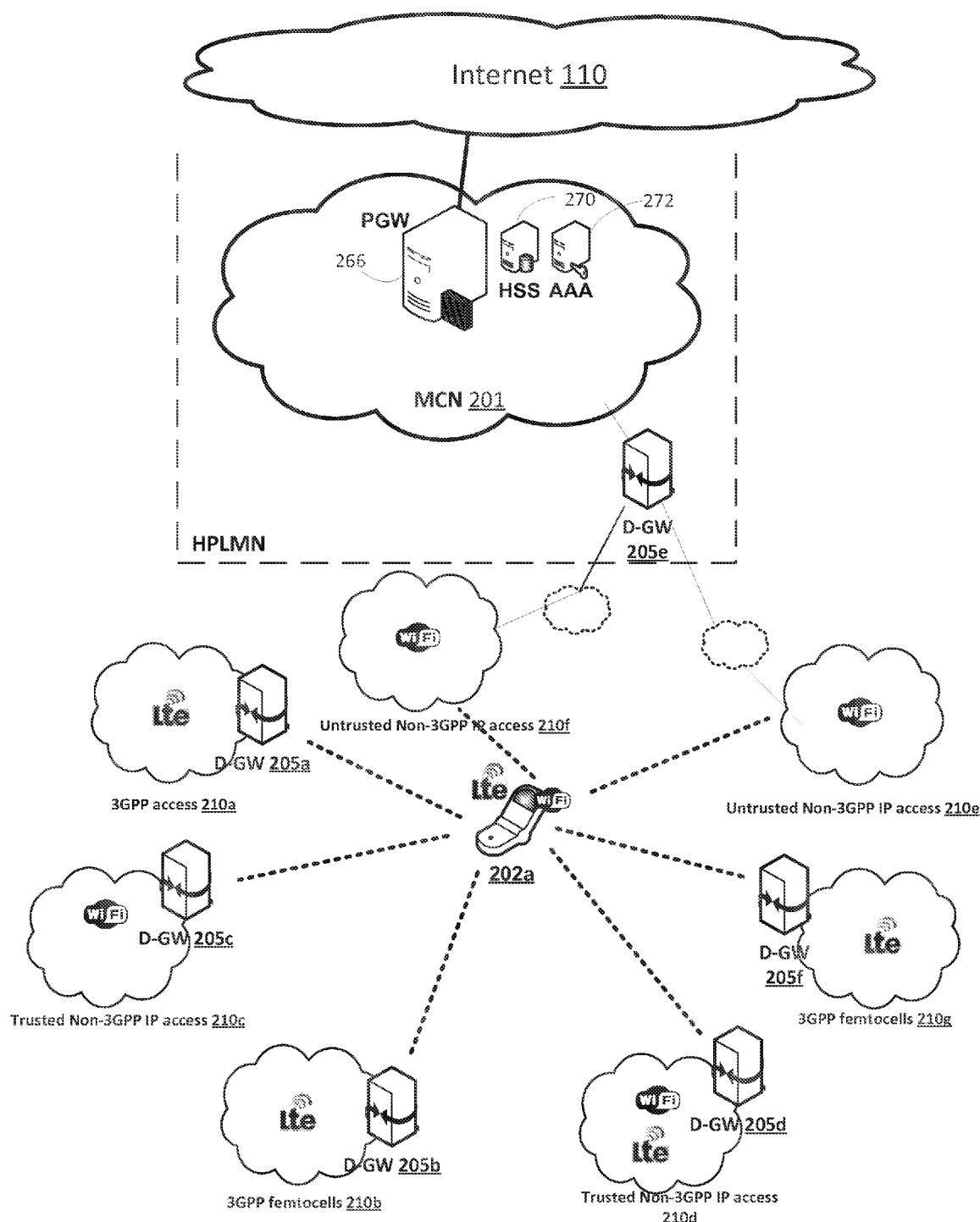
FIG. 7 shows an example of a Distributed Gateway (D-GW) in a dense network.

FIG. 7 shows an example of a D-GW in a dense network that may be provided and/or used in the systems and/or methods herein. As shown in FIG. 7, the device 202a may connect to one or more D-GWs 205a-f associated with one or more networks 210a-g and/or the core network 201. In an example, one of the D-GWs 205a-f may be an anchor node and the device 202a may connect to another of the D-GWs 205a-f when moving. For example, the D-GW 205a may be an anchor node (e.g., for the device 202a currently). The device 202a may connect to another D-GW such as one or more of the D-GWs 205b-f (e.g., another anchor node) when going to another access GW implementing DMM, for example, while maintaining session continuity.

In an example, systems and/or methods herein may provide and/or use an anchor node selection (e.g., an enhanced anchor node selection). For example, one or more potential target anchor nodes may be discovered in a dense network environment. An anchor node selection may be performed, for example, in an intelligent manner to take advantage of the multiple choices and to avoid poor selections. Examples described herein may enable the device to take advantage of the one or more choices and to select an anchor node based on the device's wishes, capabilities, properties, and/or the like. In an example, to provide a selection enhancement, capability discovery and/or improvements to existing handover decision procedures may be provided and/or used.

For example, capability discovery may be provided and/or used, for example, to improve the anchor node selection. In capability discovery, a device may know, for example, in advance that an anchor may have more or a higher amount of load compared to another anchor node that may be close to the device and may use such knowledge to reduce or avoid undesirable handovers. Methods, procedures, techniques, and/or the like to determine and maintain the anchor node load and other related information using, for example, capability discovery may be discussed herein. In an example, the device may be able to select the target anchor node based on the features supported by the different discovered anchors as described herein.

In an example (e.g., to provide capability discovery), one or more anchor nodes may advertise, broadcast, send, and/or provide features that may be supported thereby via a router advertisement (RA) such that such information and/or features (e.g., capability information, load information, and/or the like) may be received by the device such that the device may select an anchor node based the information. For example, when sending RAs, an anchor node may advertise its supported feature such that they may be received by the device. According to an example, an RA may be sent periodically or in response to a Router Solicitation (RS). Using the RA for such capability discovery may be an easier implementation for the anchor node and/or the device, and may not involve the support of additional protocols. To advertise mobility features (e.g., by sending the RA), a bit such as a special bit for mobility features category may be provided and/or used, for example, in the RA. Accompanying bits for network-based IFOM, client-based IFOM, Bandwidth Aggregation (BWA), DMM, and/or Inter-Unit Transfer (IUT) may also be provided and/or used. The foregoing may provide capability discovery from the device side. For the anchor node to discover which features may be supported by the device, in an example, the device may add such information (e.g., via one or more bits) to the RS (e.g. similar to RA modifications).

Another example for providing capability discovery may be to use modified Dynamic Host Configuration Protocol (DHCP) messages that may be exchanged between the device and the anchor node. Similar to RA/RS, the DHCP messages may be modified and/or added to advertise the mobility features capabilities, for example, using DHCP offer, DHCP lease, and/or the like. For example, information may be added to and/or modified in (e.g., hits thereof) to advertise, provide, and/or broadcast mobility features of the device and/or anchor node similar to the RA/RS.

As described herein (e.g., in addition to the supported mobility features discovery performed between the device and the anchor node), the load information for an anchor node (e.g., an anchor node "load") may be sent to the device (e.g., as part of capability discovery), for example, to improve the anchor node selection. For example, if an anchor may be overloaded, the anchor node may accept a device's registration, but it may be slow to establish tunnels and/or forward data. As such, in an example, the device may scan the network and using the load information received may avoid handing over to anchor nodes that may be available but may be overloaded (e.g., may have a load that may result in slow data exchange and/or tunnel establishment) based on the load information and/or the additional capability information such that the device may reduce handovers to anchor nodes that may result in slow data exchange or tunnel establishment. In examples, the "load" may be represented by a variety of different measurements, for example, CPU usage, number of device's registered, number of tunnels established, percentage of data throughput used on the link, or the like. Additional information that may help the target anchor node selection may be advertised to the device in the same way. Further, in an example, a group identifier may be another field that may be advertised, for example, by the GW as described.

For at least some of the examples herein, L2 attachment may be performed, for example, to provide the capability information, load information, and/or the like. For example, capability information (e.g., supported features such as IFOM, BWA, IUT, client-based or network-based DMM, and/or the like) current load, and/or the like) may be obtained and/or received before attaching to the target access point. To obtain such information, one example may be to use Access Network Query Protocol (ANQP), for example, when it may be supported. ANQP may allow and/or enable the device to query the access point to obtain some information prior to network attachment. As such, enhancing ANQP with the information as described herein (e.g., the capability information) may be provided and/or used. Another example may be to use the ANDSF server to obtain this information. The Access Network Discovery and Selection Function (ANDSF) server may be capable of providing to the device information about the network topology and access points in the device's location. Enhancing ANDSF by adding the information (e.g., capability information) to the ANDSF Information Elements (IEs) may be performed, provided, and/or used.

According to an example, groups of anchor nodes may be used, coordinated, provided, and/or maintained, for example, for anchor node selection. For example, improved capability discovery may be used for faster anchor node selection. However, anchors may be close to the device in a dense network and handovers may be performed due to this density. Anchor node selection may be improved by creating groups of anchor nodes. The anchor nodes within the same groups may be configured with the capabilities of the other nodes and may be able to advertise those capabilities to the device. This may enable the WTRU to obtain capability information regarding multiple anchor nodes during the capability discovery phase with one of these nodes. Dynamic information such as load information including the current load may be obtained by each node.

Such a group may enable faster or node selection. For example, if a group may include 5 anchor nodes and 2 of them support the feature that the device may wish or want to use, the device may perform its selection by considering those 2 nodes. In an example, the device may perform the selection, knowing that in advance based on the information provided in the groups, that those 2 nodes support those features.

An improved handover decision procedure may be provided and/or used (e.g., based on or via such groupings). For example, a group may improve a handover decision procedure by avoiding undesirable handovers. Using normal, usual, and/or existing handover decision procedures, the device may perform an undesirable or useless handover. An undesirable handover may be a handover that usually brings some benefits but the cost of such a handover may be greater than the benefits. This may happen if, for example, the device may detect that a closer anchor node may be available. This device may be maintaining a number (e.g., a large number) of active flows and these flows may be anchored at different anchor nodes. The decision for the device to handover to a closer anchor node may imply and/or result in updating a number (e.g., a large number) of tunnels to maintain connectivity with the previous anchor nodes.

In an example (e.g., to avoid undesirable handovers), the anchor nodes may be grouped. For example, the anchor nodes that may be close to each other may be organized, collated, and/or provided in a group. Using the group, the device may be allowed to handover to another anchor node, for example, the anchor node may be part of a different group than the one from the currently connected anchor node or GW. Additionally, in examples, a handover may be performed, provided, and/or allowed to an anchor node in the same group if the device may have arrived to its final destination and/or if the device may stay connected with the same anchor node for a minimum period of time (e.g., which may be configurable).

The anchor node selection (e.g., when using the DMM feature) may be modified to take into account the group using, for example, a group identifier. Table 1 illustrates how this information may be maintained by the device.

TABLE 1

Available Access GWs & Group ID

| Interface | Currently Connected Access GW | Group Identifier | List of available Access GWs/GroupIDs |
|---|---|---|---|
| IF#1 | AGW_1 | GroupID_A | AGW_10, GroupID_A<br>AGW_11, GroupID_B<br>AGW_12, GroupID_A |
| IF#2 | AGW_2 | GroupID_B | AGW_20, GroupID_A<br>AGW_21, GroupID_B<br>AGW_22, GroupID_B |

According to an example, a group may be configured by the operator, for example, giving the operator control over the device's behavior. Further, defining many small groups (e.g., a group with a smaller number of anchor nodes) may lead to more handovers with a shorter data path while defining larger groups (e.g., a group with a larger number of anchor nodes) may lead to less handovers with a longer data path.

The device may learn the anchor node's group identifier by, for example, using capability discovery as described herein (e.g., using the information associated with capability discovery and the methods of providing such information).

Figure 8A:
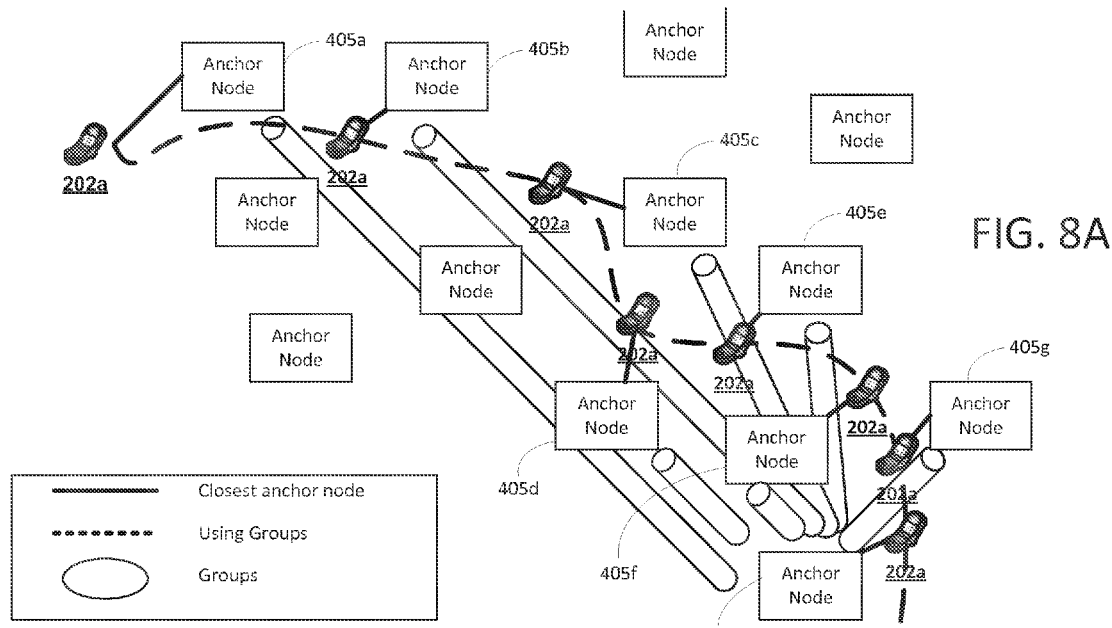
FIGS. 8A-8B show respective examples of using a closest anchor node and a group of anchor nodes that may help reduce or minimize the number of handovers or tunnels.
Figure 8B:
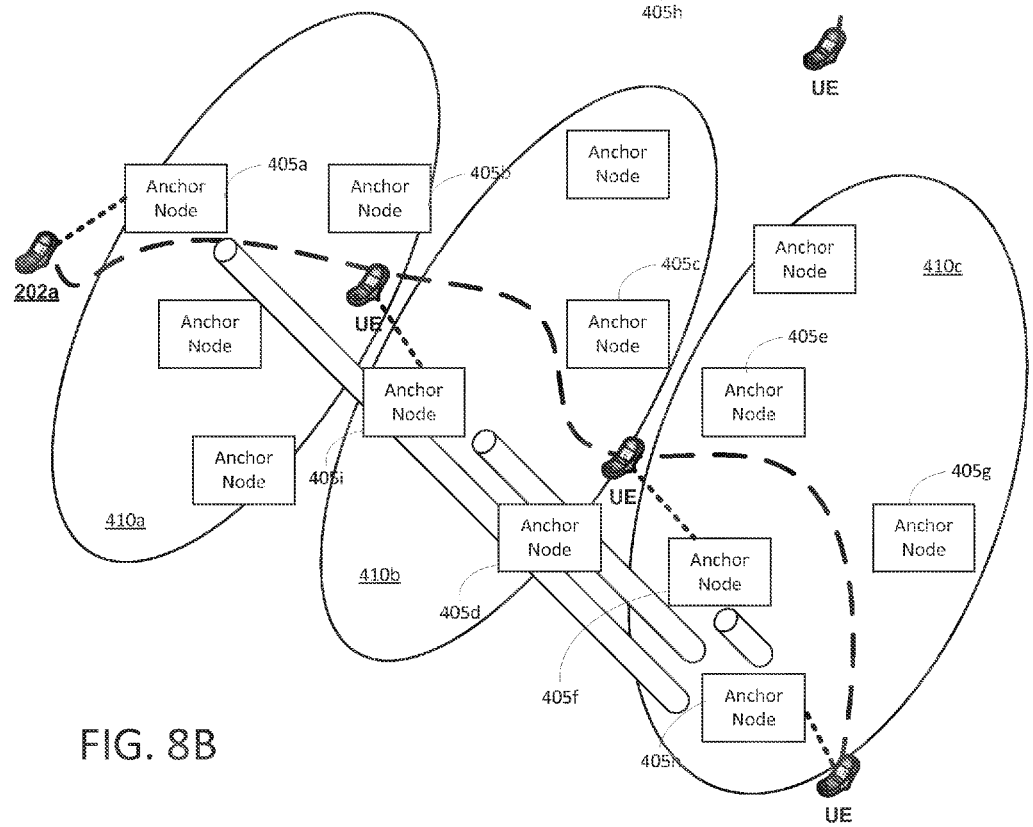

FIGS. 8A-8B illustrate an example of providing one or more groups, for example, to reduce and/or minimizing the number of handovers or tunnels. In particular, FIG. 8A illustrates a device's route and handovers performed to anchor nodes without grouping. For example, as shown in FIG. 8A, the device 202a may perform a handover to a closest anchor node such as anchor nodes 405a-h while the device 202a may be moving. As described herein, the anchor nodes 405a-h may be a D-GW such as D-GWs 205a-f, a L-GW such as L-GWs 311a-d, and/or any other suitable anchor node or gateway. In an example, the anchor nodes a-h may be selected based on or using distance evaluation as described herein. Further, as shown in FIG. 8A, the device 202a may perform a handover to a target anchor node (e.g., anchor nodes 405a-g) that seems to be a good choice at that time, but which leads to multiple handovers before reaching the final destination anchor node 405h. As shown, seven handovers (e.g., a handover to 405b-h) may be performed from the original anchor node 405a to the target anchor node 405h before reaching the target anchor node 405h.

FIG. 8B illustrates the device 202a route of FIG. 8A with one or more of the anchor nodes 405a-i grouped into groups 410a-c. As such, in FIG. 8B, anchor node selection (e.g., selection of the anchor node 405a, 405i, 405f, and 405h by the device 202a as shown) may be performed by taking into account a group identifier of the groups 410a-c of each available anchor node. As shown, the number of handovers from the original anchor node 405a to the target anchor node 405h may be reduced or limited (e.g., three compared to FIG. 8A which may have seven), for example, using such groupings. Additionally, the device's node selection may be modified to avoid handovers within the same group such as within the groups 410a-c.

To avoid situations where the benefits may be less than the cost to do a handover, the cost of the handover (e.g., the number of anchor nodes with which connectivity may be maintained) may be considered in the handover decision algorithm, in addition to other features and/or information (e.g., a, handover to an anchor node that may be closer, that may offer more and/or better services compared to the current anchor node, that may be cheaper, that may be less loaded, and/or the like).

In an example, distance evaluation may be performed as described. For example, another technique or method to help anchor node selection may include a capability of a device to evaluate the distance between itself and the anchor nodes it may find. With such a capability, the device may trigger a handover if it may be located at a greater distance from a current anchor node than a maximum acceptable distance. A target anchor node (e.g., to handover to) may be selected among a list of anchor nodes that may be within a range of distance (e.g., the same range), for example, close to the device.

The maximal acceptable distance may be configured at the device (e.g., it may be pre-configured or downloaded by the operator on the device, fetched by the device, and/or the like). According to an example, configuring a large maximal distance may minimize the number of handovers while configuring a small maximal distance may increase the number of handovers.

One technique and/or method to evaluate the distance between the device and the anchor nodes may include adding a geo-location of the anchor node with the capability discovery described herein. The device may know its own geo-location using, for example, an internal GPS. Further, in an example, one or more calculations may be done or performed by the device to determine which anchor nodes may be within which distance range. Distance ranges may also be configured such that anchor nodes within the same range may be considered at an equal distance. Other factors may be taken into account to do the anchor node selection such as, for example, anchor node load, average CPU usage, a device's expected route, and/or the like.

The systems and/or methods herein for selecting an anchor node may further include device route prediction. Device route prediction may enable a device to perform an anchor node selection by selecting a best anchor node in particular or specific situations. For example, knowing in advance what route the device may take, to which direction the device may be going, where the device's final destination may be, and/or the like may improve a target anchor node selection process (e.g., selecting the anchor nodes to handover to). For example, if the device may use the history, it may not have to do a scan and capability discovery for each of the anchor nodes (e.g., L-GWs, D-GWs, APs, and/or the like) and, thus, may save at least some time. The device may also connect to the anchor node quicker. The number of handovers may be reduced or minimized by selecting an anchor node that may be part of the closest list of nodes and that may be also on the expected device's route. For example, a device may handover to a target anchor node that may seem to be a good choice at that time, but that may end up being a poor choice, for example, because the target anchor node may not be in the device's direction. Another anchor node (e.g., that may not have been the first choice in the anchor node selection) may be a better choice in the long term such that extra handovers may be reduced or avoided. To reduce or avoid such extra handovers and/or select a better suited anchor node, systems and/or methods to predict where the device may be going may be performed (e.g., a route prediction procedure) as described herein.

To determine the device's expected route, systems and/or methods may be provided and/or used. In an example, such systems and/or methods may be based on a device's routes, history, and configuration. For example, the device's behavior and/or routes may be monitored and/or a history of the behavior and/or routes may be kept and/or stored. Table 2 shows an example of maintaining a device's history or configuration. Further, according to an example, a user of the device may enter locations and/or periods that may usually be stable and/or that may typically be taken by the user. For example, the user may enter that around 7:00 AM Mon-Fri, the device may move from home to the office. The route (e.g., the list of anchors) from home to the office may be registered automatically by the device.

TABLE 2

Device's Route History/Configuration

| Time | First Anchor Identifier | Final Destination Anchor Identifier | Expected List of intermediate Anchor Identifier | Route's source |
|---|---|---|---|---|
| Week days - 7:00 AM | Anchor_Home | Anchor_Office | Anchor_Home, Anchor1, Anchor2, Anchor3, etc, Anchor90, Anchor73, Anchor_Office | User configuration |
| Week days - 5:00 PM | Anchor_Office | Anchor_Home | Anchor_Office, Anchor73, Anchor90, etc, Anchor3, Anchor2, Anchor1, Anchor_Home | User configuration |
| 12:00 PM | Anchor_Office | Anchor_resto1 | Anchor_Office, etc, Anchor_resto1 | Route saved |
| 12:00 PM | Anchor_Office | Anchor_resto2 | Anchor_Office, etc, Anchor_resto2 | Route saved |

In an example, once the device's route from home to the office may be known (e.g., based on input from the user, based on recognition by the device and/or system, for example, by monitoring the anchors used at particular times, and/or the like) from the history, on Monday morning when the device may start to move and perform handovers between anchor nodes, anchor node selection may be optimized and/or simplified because the route to the end destination may already be known. As such, when the device may start to move, the device anchor node selection may be optimized and/or simplified as the device may already know the route between home and the office. In an example, a time entry in the table may be used to facilitate the search and/or to select an anchor node in the anchor node selection procedure or method. For example, route prediction that may be used to select an anchor node (e.g., in the anchor node selection procedure or method) may be based on a match between a list of expected anchor nodes from the history including the routes stored therein and a list of available anchor nodes detected by the device (e.g., when moving).

For example, the device may detect one or more anchor nodes that it may handover to and/or that may be available or in the vicinity of the device (e.g., that may be on a route the device may be taking, for example, when the device may be moving). The device may determine whether the detected anchor nodes may be on a route in the history. For example, to determine whether the detected anchor nodes may be on a route in the history, the device may compare one or more anchor nodes, a time of accessing those anchor nodes, a day of accessing those anchor nodes, and/or the like with similar information of the routes stored in the history. If there may be a match or correlation between one or more of the detected anchor nodes, current time of day, current day, and/or the like and the information in associated with a route in the history, the route the device may be taking (e.g., the current route) may be the same as a route in the history (e.g., the device may determine this). In an example (e.g., if or when the anchor nodes may determine it may be on a route in the history), the device may know the anchor nodes it may connect to as it may move further down the route before arriving at those anchor node (e.g., before being in the vicinity of those anchor nodes). As such (e.g., when the device may detect anchor nodes that may be available (e.g., in the vicinity of the device)), the device may select one of the detected anchor nodes in the history instead of the detected anchor nodes that may not be in the history. The device may connect to the detected anchor node included in the history.

According to an example, anchor node selection may be dynamic such that it may depend on the device location along with, for example, anchor node availability, load, and/or the like. As such, a device may re-perform the same route without connecting to the exact same list of anchor nodes and knowing the destination in advance may make it possible to select a best available anchor node on the route (e.g., regardless of whether the anchor node may be the same each time the route may be traveled or different based on the dynamic selection and information used thereby).

As described herein, the device may autonomously save routes during the day (e.g., without user intervention). The saved routes may be kept for a certain period of time. If it may be determined that one or more routes may be repeated (e.g., a particular number of times or frequently), the routes may be kept in the table. Other routes that may be determined to not be repeated may be deleted. In an example, the route prediction table may be limited in size. As such, the device may keep track of the routes usage, for example, by counting the number of times that the routes may be used or by keeping the last time that the routes may have been used to decide if a route should be kept or not. In an example, routes configured by the user may be kept until deleted by the user.

Figure 9A:
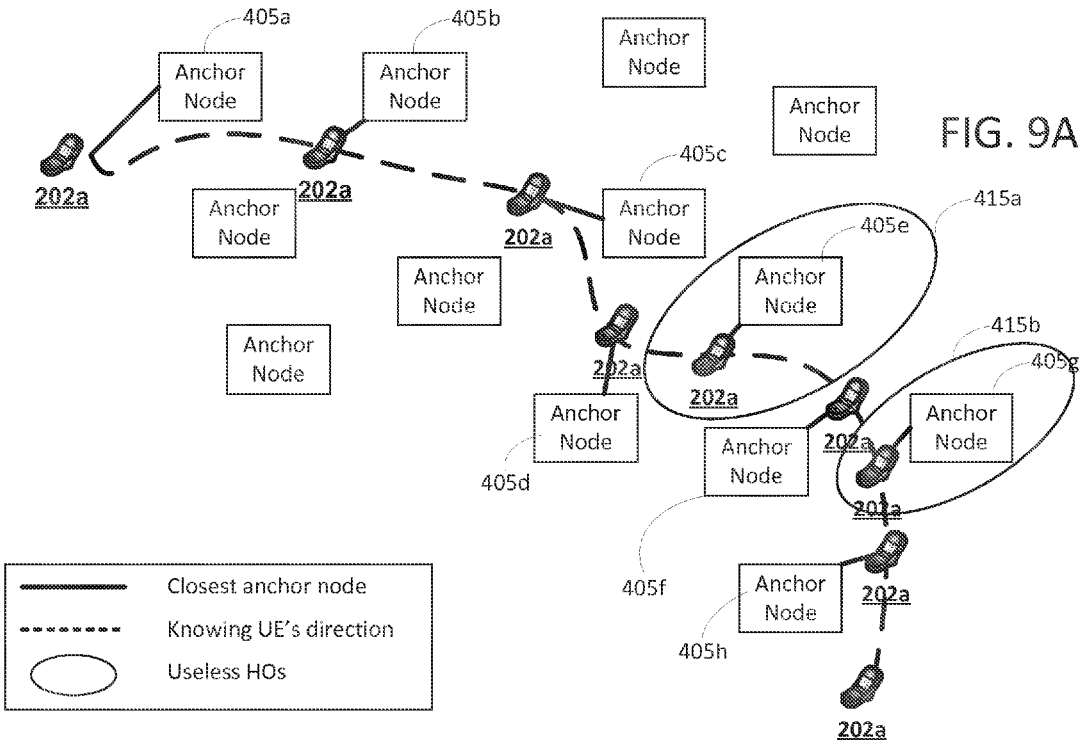
FIGS. 9A-9B show respective examples of using a closest anchor node and route prediction based on a device's direction to help avoid useless handovers.
Figure 9B:
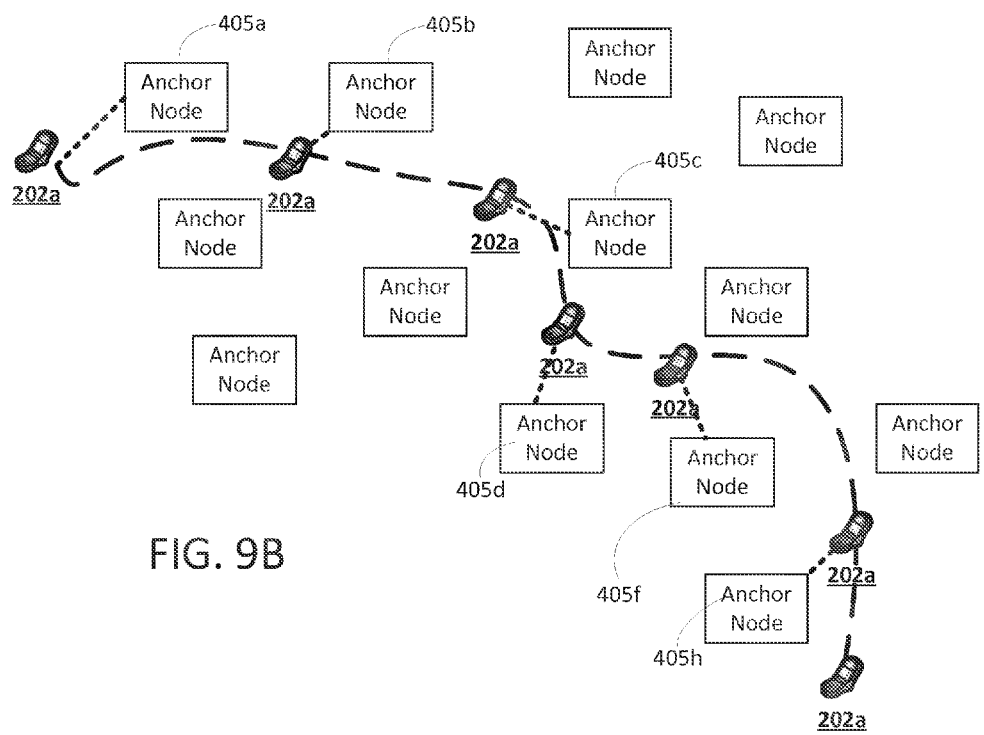

FIGS. 9A-9B illustrate anchor node selection without and with route predication, respectively, that may be used to avoid or reduce useless handovers. In particular, FIG. 9A shows a device's route and anchor node selection on such a route along with handovers to those anchor nodes using distance evaluation. For example, as shown in FIG. 9A, the device 202a may travel the route shown and may select a closest anchor node including the anchor nodes 405a-h while the device 202a may be moving from the anchor node 405a until reaching the destination at anchor node 405h. The device 202a may select the anchor nodes 405a-h based on distance evaluation as described herein. The device 202a may perform a handover to a target anchor node such as the anchor nodes 405e and/or 405g that may seem to be a good choice at that time (e.g., based on distance evaluation) but may end up being a poor choice, because the target anchor node may not be in the device's 202a direction. Further, as shown, one or more handovers such as handover 415a and/or 415b to one or more anchor nodes such as anchor nodes 405e and/or 405g may be performed, but may not be on the route and, thus, may be unnecessary.

FIG. 9B illustrates the device's 202a route of FIG. 9A with taking into account a route prediction of the device 202a. In an example, anchor node selection may be performed (e.g., anchor nodes 405a, 405b, 405c, 405d, 405f, and 405h may be selected) knowing in advance the direction the device 202a may be travelling (e.g., using route prediction). As shown in FIG. 9B (e.g., compared to FIG. 9A), fewer handovers may be performed when the device's 202a route may be known. For example, a handover to anchor node 405e and/or 405g shown in FIG. 9A may not be performed regardless of whether they may be the closest anchor node, because they may not be on the device's 202a route. As such, useless handovers such as handovers 415a and/or 415b FIG. 9A may be avoided or reduced by using route prediction. As shown, route prediction may enable use of multiple connections in a dense network with the benefits of being connected to an anchor node that may be close to the device (e.g., may have a shorter data path) while minimizing the number of created tunnels and handovers that may not be on the route.

According to an example, a confidence level may be used with route prediction as described herein. The confidence level may be a confidence that the expected route is going to be followed. This confidence level may depend on many factors. In an example, the confidence level may depend on a history of some days or months, a configuration, a portion of the route being confirmed, and/or the like. For example, the device may maintain a history of its route and/or final destination. Based on such a history and/or destination, the device may build, over time, a stable route prediction table. This may be performed by saving the point of departure, destination, and/or route at different times of the day. The destination and route may also be configured by the user. The confidence level for the route prediction may be based on the portion of the predicted route that may be confirmed (e.g., the device may confirm it may connect to a particular number of anchor nodes in a predicted route such that a confidence level may be established based on the number of anchor points connected to and/or a threshold thereof). For example, if the device may connect to at least first five gateways and/or five gateways out of ten, a confidence level may be defined to be HIGH. Further, in an example, if the device may connect to the first three and/or three gateways, but less than five out of ten, the confidence level may be defined as MEDIUM and/or if the device may connect to less than the first three or three gateways out of ten, the confidence level may be defined as LOW. As such, in examples, different levels may be defined such as LOW, MEDIUM, and/or HIGH, with configurable thresholds. According to an additional or another example, a percentage, for example, 10% as very low, 20% as low, and the like may be used for the confidence level.

As described herein, the anchor node selection may be dynamic such that it may depend on the device location and on the anchor node availability, load, and/or the like. As such, it may be possible for a device to re-perform the same route without connecting to the same list of anchor nodes. According to an example, even if the match between the current list of anchor nodes and the saved list may not be an exact match, it may be headed toward the same final destination, and the route prediction may be performed and may be helpful. Being able to use the predicted route to select the next anchor node may be useful as described herein and/or using the confidence level with the predicted route may facilitate anchor node selection, for example, when the goal may be to connect directly with the final destination anchor node (e.g., based on IP flow segregation) and may enable intermediate anchor nodes to be skipped on the route.

Systems and/or methods for anchor node selection may further take into account destination anchor procedures, algorithms, and/or methods. For example, a device that may implement route prediction may (e.g., possibly) recognize a route that it may know. In an example, once the device has identified with an acceptable level of confidence that the route is known, the device may connect (e.g., immediately) to the final or destination anchor node. An IP address from that final anchor node may be obtained and flows (e.g., that the device may know or may believe may still be used when the device may reach its destination) may be anchored to that final or destination anchor node. The device may re-evaluate if the route prediction may still be valid each time it connects to an anchor node (e.g., a new access gateway). In an example (e.g., if the route may not be as predicted or if the device may stop moving and stays connected with the same access gateway for a long period (e.g. a configurable period of time)), the route prediction may be re-evaluated and may be invalidated. In this case, the IP address obtained from the expected final anchor node may be set to "deprecating" such that it should not be used if additional flows may be started.

One or more benefits of attaching with the final anchor node in advance may be obtained with flows that last for a particular period of time (e.g., long enough for the device to reach the final destination). These flows may be anchored at the final anchor node and may stay alive for some time. Globally, the traffic generated by these flows may follow a shorter path to reach the destination. In addition, fewer tunnels with intermediate anchor nodes may be created and/or maintained, for example, saving resources in the network.

To be able to connect to the final anchor node in advance using a network-based solution, the device may inform the node such as an access gateway that it should act as an access GW (e.g., MAC) and not as an anchor (e.g., LMA). The device may be able to disable the DMM functionality on the access gateway. The device may also be able to provide the desired anchor node's IP address to the access gateway. The device may negotiate the use of DMM with the access gateway using DMM capability negotiation. For a client-based example, the signaling may be controlled by the device itself so no negotiation may be performed with the access GW.

Using the DMM capability negotiation, the device may decide to use or not use the access gateway DMM capability. Further, the device may decide to connect to the node or gateway and may use it as a DMM anchor node, may use it as a regular access GW to a specified anchor node (e.g., DMM anchor node), may use it as a regular access GW that may interact with another node in the network (e.g., PGW) and/or the like. The device may also use it as an anchor node and/or as an access GW to connect to a specified anchor node.

The device may discover that the access gateway may be DMM-capable. This may be discovered as described herein. The device may determine and/or decide if it may want to use this gateway as an anchor node or not. The device may inform the gateway about its decision because acting as a DMM anchor node may involve registrations with different nodes, updates into a network database, usage of memory or CPU, and/or the like. This may be avoided by notifying the gateway that it should not act as an anchor node for this device but as an access GW. The device may connect to the access GW and inform the access GW if it may want to use DMM or not. In an example the device may inform the GW of whether it may want to use DMM or not via layer 2 signaling, RS, DHCP, and/or the like. In the case where the device may not want to use this access GW as an anchor node, the device may provide the desired anchor node IP address (e.g., a network-based example). The access GW may register the device (e.g., using PMIP registration) with the specified anchor node. In an example (e.g., the client-based example), the device may itself handle the registration with the anchor node so that the anchor node's IP address may not have to be sent to the access GW.

Figure 10A:
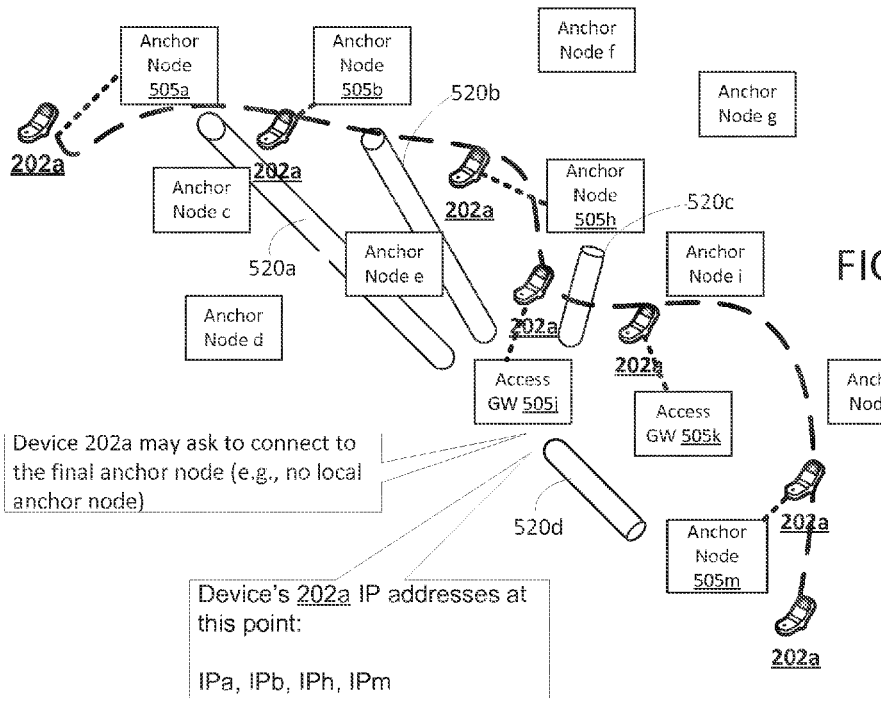
FIGS. 10A-10B show an example of connecting to a destination anchor node, for example.
Figure 10B:
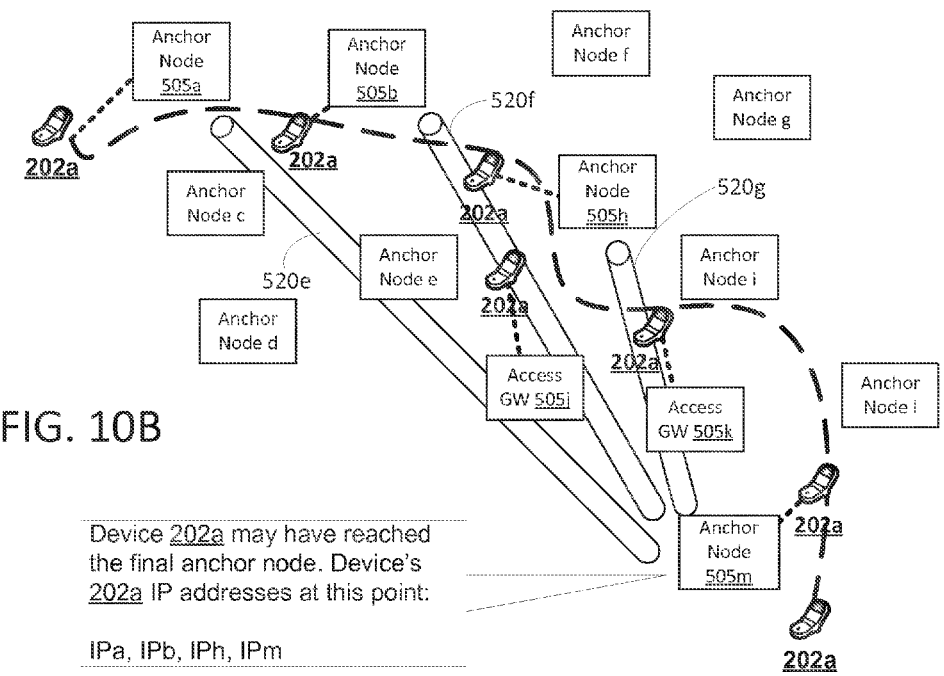

The following example demonstrates how the route prediction algorithms used with the DMM capability negotiation may be used to connect to the final anchor node and thereby minimize the number of tunnels and handovers. For example, FIGS. 10A-10B show an example of connecting to a destination anchor node (e.g., without intermediate IP addresses). As shown in FIG. 10A, when the device 202a may discover access GW 505j, it may recognize the route with a high level of confidence. The device 202a may decide or determine that it may or should connect (e.g., immediately) with the final anchor node such as anchor node 505m. Further, in an example, a current access GW of the device 202a such as access GW 505j may be used as an access GW rather than a DMM GW. As such, no IP address may be obtained from the access GW 505j. One or more tunnels (e.g., tunnels 520a-c) with previous anchor nodes (e.g., 505a, 505b, and/or 505h and also, in an example, 505k) may be created to maintain session continuity. A tunnel such as tunnel 520d may also be created with the final anchor node 505m and an IP address may be obtained from this anchor node 505m. As described herein, flows that may be identified as "long duration flows" may use this IP address "IPm" so that the traffic generated by these flows may, over time, may be sent closer to the device 202a (e.g., once the device 202a may reach its final destination). The number of tunnels may be minimized using this example as no additional IP addresses may be assigned to the device 202a from this point on. In such an example, intermediate access GWs may also act as access GWs.

FIG. 10B may show the resulting tunnels when the device 202 may reach the final destination Anchor node 505m. As shown in FIG. 10B, tunnels 520e-g may be established (e.g., directly) between the anchor nodes 505a, 505b, and 505h and the destination anchor node 505m respectively. As shown, the tunnel 520d between the access GW 505j and the anchor node 505m may no longer be present (e.g., may be torn down), for example, once the device 202a may reach the destination anchor node 505m.

In examples, smart access selection may be used by the device. For example, in a DMM-enabled network, the device may connect, for example, via a single interface, to different gateways supporting DMM and may end-up having multiple flows anchored with these different gateways. The device may obtain an IP address from each DMM-gateway (e.g., which may also be an anchor node). The device (e.g., using multiple IP addresses simultaneously and being connected to different anchor nodes) may enable, use, and/or provide a smart connection selection. The smart connection selection may be an extended IP flow segregation. Using extended IP flow segregation, the device may decide based on, for example, the application types and policies, which IP address should be used as the source IP address in its communication with its peers and, for example, which data path may be used.

The IP addresses that may be configured on the device may indicate if the device may be directly connected to the anchor node that has allocated this IP address to the device or if this anchor node may be reachable via a tunnel. The source IP address selection on the device may consider this information for an optimized selection. For example, a short video streaming on video provider site may lead to the selection of the current anchoring node IP address while a call on a voice communication site that may be expected to last for a long period (e.g., at least long enough for the device to reach its final destination) may select an IP address from the final destination anchor node. It may be expected that the traffic may take the shortest path, because the device may reach the final destination and may continue to receive the traffic directly routed to this destination anchor node. The first packets may be tunneled from the final destination anchor node to the device's current location (e.g., en route to the final destination).

The following may be an example of how the extended IP flow segregation may be used in a DMM-enabled network. For example, a device may be connected to a DMM anchor node, with possible tunnels to previous anchor nodes. The device, using route prediction, may connect in advance to the final or destination anchor node. The device may maintain two active IP addresses (e.g., the one from the current anchor node where the device may be connected and the one from the final destination anchor node). The other IP addresses (e.g., from the previous anchor nodes) may be set to deprecating such that these IP addresses may not be selected for additional flows.

Using segregation rules, the device may decide to use the current IP address for certain flows and use the final anchor node IP address for other flows. For example, flows that may be expected to last for a short period may be anchored at the current anchor node while flows that may be expected to last for a long period may be anchored at the final anchor node. It may be expected that this capability may be present in the device (e.g., provided by the application itself, based on deduction made by the device, history, packet inspection, and/or the like).

The intermediate access gateway may be used as a DMM anchor node as well as an access GW to reach to final anchor node alternatively or in addition to an example in which the access GW may create a tunnel to the final anchor node, but may not allocate a local IP address to the device. In an example (e.g., the current solution), a benefit of DMM, for example, having the additional flows anchored with the current anchor node may be obtained while the flows that may be identified as "long duration" may be anchored directly with the final anchor node (e.g., benefiting of a global shorter path). However (e.g., with the current solution), the number of tunnels to create or maintain may be increased, for example, by one (e.g., the tunnel to the destination anchor node) until the device may reach the final destination.

Figure 11A:
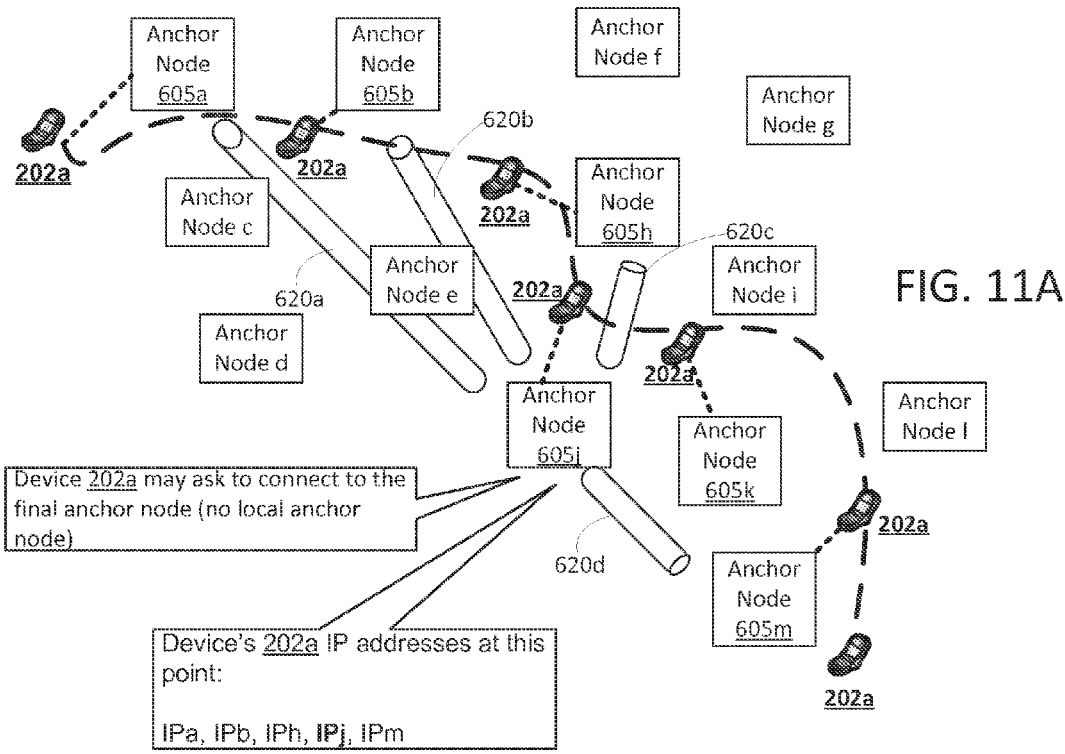
FIGS. 11A-11B show an example of connecting to a destination anchor node and/or intermediate anchor nodes.
Figure 11B:
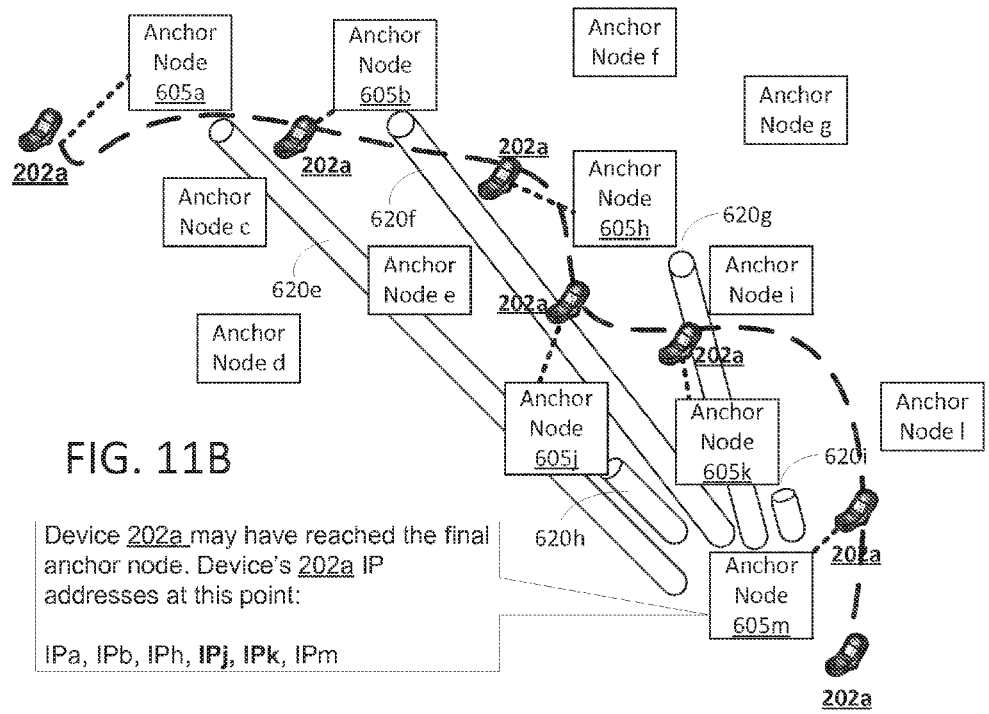

The device may negotiate with the access gateway regarding the creation of the additional tunnel to the final anchor node. FIGS. 11A-11B show an example of connecting to a destination anchor node and intermediate anchor nodes. In an example, FIGS. 11A-11B may relate to FIG. 9B where the route prediction algorithm may be used to minimize the number of tunnels and/or handovers. For example, the same route of FIG. 9B may be used in this example. As shown in FIG. 11A, the device 202a may detect anchor node 605j and, for example, based on the detection, the device 202a may recognize the route with a high level of confidence such that the device 202a may decide that it should connect immediately with a final anchor node (e.g., anchor node 605m) as well as with a current anchor node (e.g., anchor node 605a, 605b, 605h, 605j, and/or 605k). In an example, the current anchor node (e.g., anchor node 605j as an example) may be used as an access GW and as a DMM GW (e.g., an anchor node). In such an example, an IP address may be obtained from anchor node 605j. One or more tunnels such as tunnels 620a-c with previous anchor nodes (e.g., anchor nodes 605a, 605b, and/or 605h) may be created to maintain session continuity. A tunnel (e.g., 620d) may also be created with the final anchor node 605m and an IP address may be obtained from this anchor node 605m. As described herein, flows identified as "long duration flows" may use this IP address "IPm" so that the traffic generated by these flows may, over time, use the shortest path to reach the device 202a (e.g. once the device 202a may connect to its final destination).

FIG. 11B may show the resulting tunnels when the device 202a may reach the final destination anchor node 605m. As shown in FIG. 11B, one or more tunnels such as tunnels 620e-i may be established (e.g., directly) between the anchor nodes 605a, 605b, 605h, 605j, and 605k and the destination anchor node 605m respectively. As shown in FIG. 11B, the number of tunnels may not be minimized using this example, for example, since IP addresses may be assigned to the device 202a by intermediate access GWs.

In an example, a final anchor node distance evaluation may be used to determine at which point connecting to the final anchor node makes sense (e.g., in addition to the route prediction confidence level). For example, if the final anchor node may still be considered "far" from the current location, the device may decide not to connect to it at this time. The description of "far" may be a distance that is too far to consider anchoring flows at this point to this anchor node. This "far" value may be configurable, for example, a certain distance that is considered as "far" may be specified and used by the device in its anchor node selection method or procedure.

In an additional or another example, smart connection selection in a content data network (CDN) may be provided and/or used. With the multitude of available GWs in a dense network environment, the probability to be anchored at a GW where the data may be located (e.g., or close to the data) may be high. The device may select the connection based on where the data may be located (e.g., instead of looking at the application type as with flow segregation). For example, if the data to download or that the device may wish to access may be located at a DMM-gateway with which the device may be connected through tunneling (e.g., not directly connected), the device may decide or determine to select this DMM-gateway as the anchor node for this specific download. This selection may lead to an improved or optimal data path even if the device may move and connect to other DMM-gateways during the download.

Figure 12A:
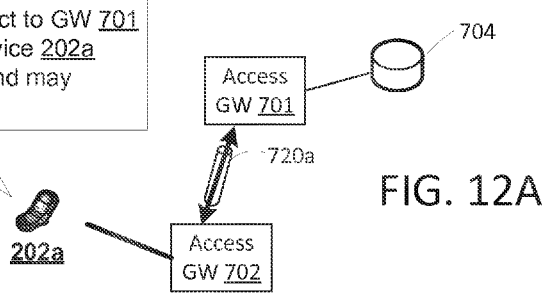
FIGS. 12A-12C show an example of smart access selection in a content data network (CDN) environment.
Figure 12B:
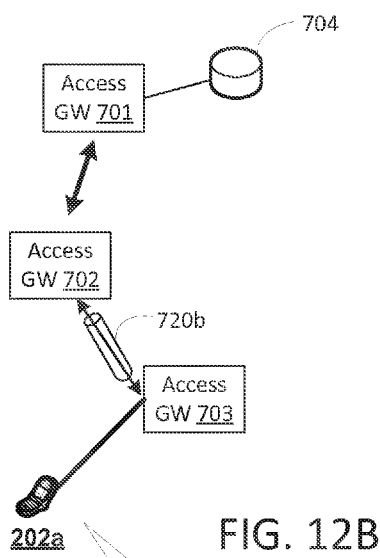
Figure 12C:
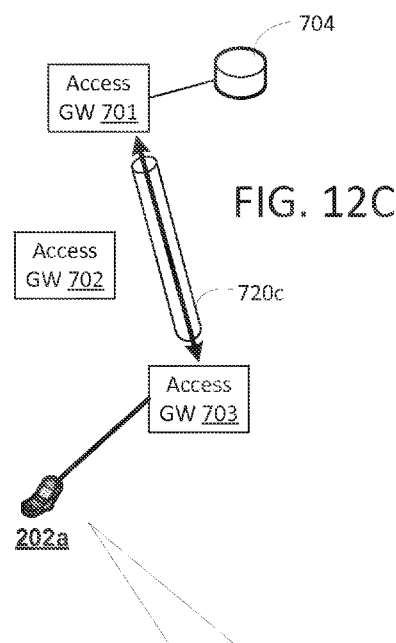

FIGS. 12A-C shows an example of smart access selection in a CDN environment. As shown in FIG. 12A, some or a portion of content 704 may be located at access GW 701. The device 202a may connect to the access GW 701 and may obtain an IP address (e.g., IP1). The device 202a may then move to an access GW 702. The device 202a may obtain another IP address (e.g., IP2). The device 202a may want, need, or wish to access the content 704 located at the access gateway 701. IP address selection may be performed. As shown in FIG. 12A, the data path may be the same IP1 or IP2 may be selected. For example, the data may be tunneled (e.g., via tunnel 720a) from the access GW 701 to the access GW 702 if IP1 may be selected. The data may be routed from the access GW 701 to the access GW 702 (e.g., via the tunnel 720a) if IP2 may be selected.

FIGS. 12B-12C show examples in which the device 202a may perform a handover to an access GW 703 while still accessing the content 704 from the access GW 701. For example, FIG. 12B illustrates the data path if the device 202a may select IP2 as the source IP address, thus using the access GW 702 as the anchoring node. For example, as shown, a tunnel 720b may be established between the access GW 702 and the access GW 703. The content 704 may be received by the access GW 702 from the access GW 701 and provided to the access GW 703 via the tunnel 720b (e.g., when the IP2 may be used to access such content 704). Further, FIG. 12C illustrates the data path of the content 704 if the device 202a may select IP1 as the source IP address, thus using the access GW 701 as the anchoring node. For example, as shown, a tunnel 720c may be established between the access GW 701 and the access GW 703. The content may be received by the access GW 703 from the access GW 701 via the tunnel 720c (e.g., when the IP1 may be used to access such content 704). Selecting the access GW 701 as the anchor node may provide an improved or optimal data path.

According to an example, a short connection time procedure and/or method may be provided and/or used. Such a short connection time procedure and/or method may include performing pre-registration with a target anchor node. For example, since a device may perform multiple handovers within a short period of time, efficient handover procedures may improve efficiency as described herein. Further, in an example, for layer 3, session continuity may be maintained. This may be performed by creating tunnels between the previous anchor node and the additional anchor (e.g., in a network-based example) and between the previous anchor node and the device (e.g., in a client-based example).

To improve such handover efficiency, pre-registration may be performed with the target anchor node. For example, pre-registration with neighbors may be used to handle pre-registration with the target anchor node. Each anchor node may know who its neighbors may be and, for example, when a device may be connecting to an anchor node, the anchor node may pre-register the device and the allocated IP addresses with its neighbors. Such a pre-registration may enable the target anchor node to quickly create tunnels toward the previous anchor nodes if the device may perform a handover, because the information to create tunnels may already be known and/or provided in the pre-registration.

In an example, pre-registration with neighbors may be extended to support pre-registration with a node that may not be a direct neighbor. For example, if the device's route prediction procedure or method may be used, but a determination or decision may not have been performed to register with the final destination anchor node, a pre-registration may be performed with this final destination node (e.g., target anchor node).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for selecting an anchor node in a dense network using distributed mobility management (DMM), the method comprising:
   receiving, at a device, capability information including load information broadcast by anchor nodes in the network;
   detecting, at the device, one or more of the anchor nodes available for the device to connect to;
   determining, at the device, whether to handover to at least one of the detected anchor nodes available based on the capability information including the load information; and
   connecting, at the device, to at least one detected anchor node available when, based on the determination, the capability information including the load information for the at least one of the detected anchor node available indicates the at least one detected anchor node is not overloaded, wherein the at least one of the detected anchor node available is not overloaded when a load thereof indicated by the capability information including the load information would not result in slow data exchange or tunnel establishment.

2. The method of claim 1, further comprising:
   determining whether to handover to the at least one of the detected anchor nodes based on a distance evaluation between the at least one of the detected anchor nodes and the device.

3. The method of claim 2, wherein the device determines whether to handover to the at least one of the detected anchor nodes based on the capability information including the load information when the at least of the detected anchor nodes is a shortest distance from distances of the anchor nodes to the device.

4. The method of claim 3, wherein the load information comprises one or more measurements including at least one of the following: central processor unit (CPU) usage, a number of registered devices, a number of tunnels established, or a percentage of data throughput used on a link.

5. The method of claim 1, wherein the capability information is received via at least one of the following: a router advertisement (RA), a dynamic host configuration protocol (DHCP), or an L2 attachment.

6. The method of claim 1, further comprising receiving, at the device, a group identifier for the anchor nodes.

7. The method of claim 6, further comprising determining whether to connect to one or more of the detected anchor nodes based on the group identifier.

8. The method of claim 7, wherein the device determines whether to handover to the at least one of the detected anchor nodes based on the capability information including the load information when, based on the group identifier, the at least of the detected anchor nodes is in a different group than a current anchor node the device is connected.

9. A method for selecting an anchor node in a dense network using distributed mobility management (DMM), the method comprising:
   storing, at a device, a history comprising one or more routes of the device including anchor nodes on the one or more routes;
   detecting, at the device, one or more anchor nodes available for the device to connect to;
   determining, at the device, whether one or more of the detected anchor nodes are on the one or more routes in the history; and
   connecting, at the device, to one or more of the detected anchor nodes that correspond to the anchor nodes on the one or more routes in the history.

10. The method of claim 9, wherein determining, at the device, whether one or more of the detected anchor nodes are on the one or more routes in the history further comprises:
    comparing the one or more anchor nodes and information associated therewith on the one or more routes in the history with the one or more detected anchor nodes and information associated therewith on a current route of the device; and
    selecting the one or more detected anchor nodes to connect to when the one or more detected anchor nodes and the information associated therewith is a match to at least a portion of the one or more anchor nodes and the information associated therewith.

11. The method of claim 10, further comprising: generating a confidence level associated with the match.

12. The method of claim 11, wherein the confidence level comprises at least one of the following: high, medium, low, or one or more percentages.

13. The method of claim 11, wherein the one or more detected anchor nodes are selected when the confidence level of the match meets or exceeds a threshold confidence level.

14. The method of claim 11, further comprising connecting to a destination anchor node of the one or more anchor nodes on the one or more routes in the history when the confidence level meets or exceeds a threshold confidence level such that an IP address from the destination anchor nodes is obtained and one or more flows are anchored to the destination anchor node.

15. The method of claim 9, wherein the one or more routes including the anchor nodes on the one or more routes in the history are at least one of the following: entered by a user of the device or saved by the device itself autonomously.

16. The method of claim 9, wherein the device connects to the one or more of the detected anchor nodes that correspond to the anchor nodes on the one or more routes in the history via tunneling.

17. A method for selecting an anchor node in a dense network using distributed mobility management (DMM), the method comprising:
    detecting, at the device, one or more anchor nodes available for the device to connect to;
    determining, at the device, whether one or more of the detected anchor nodes includes or is close to an anchor node that includes content the device wishes to access to download the content; and
    connecting, at the device, to one or more of the detected anchor nodes that includes or is close to an anchor node that includes the content the device wishes to access to download the content.

18. The method of claim 17, wherein the device connects to the one or more of the detected anchor nodes via tunneling.

* * * * *